(12) United States Patent
Smith

(10) Patent No.: US 6,798,374 B1
(45) Date of Patent: Sep. 28, 2004

(54) TRAFFIC SURVEILLANCE RADAR USING RANGING FOR ACCURATE TARGET IDENTIFICATION

(75) Inventor: Kimble Jon Smith, Loveland, CO (US)

(73) Assignee: Decatur Electronics Inc., Decatur, IL (US)

( * ) Notice: Subject to any disclaimer, the term of this patent is extended or adjusted under 35 U.S.C. 154(b) by 31 days.

(21) Appl. No.: 10/288,010

(22) Filed: Nov. 5, 2002

(51) Int. Cl.$^7$ .......................... G01S 13/91; G01S 13/42; G01S 13/08
(52) U.S. Cl. .......................... 342/109; 342/27; 342/28; 342/70; 342/104; 342/105; 342/118; 342/175; 342/194; 342/195; 342/196
(58) Field of Search .......................... 342/27, 28, 59, 342/70, 71, 72, 104–118, 128–133, 145, 146, 147, 175, 192–197

(56) References Cited

U.S. PATENT DOCUMENTS

| | | |
|---|---|---|
| 3,689,921 A | 9/1972 | Berry |
| 3,697,985 A * | 10/1972 | Faris et al. .................... 342/72 |
| 3,898,655 A * | 8/1975 | Tresselt ........................ 342/70 |
| 3,936,824 A | 2/1976 | Aker et al. |
| 4,020,490 A | 4/1977 | Millard |
| 4,052,722 A | 10/1977 | Millard |
| 4,070,634 A | 1/1978 | Barker et al. |
| 4,101,888 A * | 7/1978 | Heller et al. ................. 342/111 |
| 4,110,754 A * | 8/1978 | Endo .......................... 342/147 |
| 4,148,028 A | 4/1979 | Fujiki |
| 4,236,140 A | 11/1980 | Aker et al. |
| 4,293,859 A | 10/1981 | Sergent |
| 4,335,382 A | 6/1982 | Brown et al. |
| 4,335,383 A | 6/1982 | Berry |
| 4,740,045 A | 4/1988 | Goodson et al. |
| 4,743,908 A | 5/1988 | Brassfield et al. |
| 4,818,999 A * | 4/1989 | Kobayashi et al. ........... 342/59 |
| 5,134,411 A * | 7/1992 | Adler .......................... 342/130 |
| 5,181,037 A * | 1/1993 | Komatsu ...................... 342/70 |
| 5,181,038 A * | 1/1993 | Asbury et al. ................ 342/70 |
| 5,229,774 A * | 7/1993 | Komatsu ...................... 342/70 |
| 5,285,207 A * | 2/1994 | Asbury et al. ............... 342/129 |
| 5,302,956 A | 4/1994 | Asbury et al. |
| 5,311,189 A | 5/1994 | Nagel |
| 5,381,153 A * | 1/1995 | Saito et al. ................... 342/70 |
| 5,400,034 A | 3/1995 | Smith |
| 5,504,488 A | 4/1996 | Henderson et al. |
| 5,517,196 A * | 5/1996 | Pakett et al. .................. 342/70 |
| 5,517,197 A * | 5/1996 | Algeo et al. .................. 342/70 |
| 5,525,996 A | 6/1996 | Aker et al. |
| 5,528,245 A | 6/1996 | Aker et al. |
| 5,528,246 A | 6/1996 | Henderson et al. |
| 5,563,603 A | 10/1996 | Aker et al. |
| 5,565,871 A | 10/1996 | Aker et al. |
| 5,691,724 A | 11/1997 | Aker et al. |
| 5,793,327 A | 8/1998 | Carnes et al. |

(List continued on next page.)

OTHER PUBLICATIONS

Radar System Design and Analysis by S.A. Hovanessian; copyright 1984 Artech House, Inc., chapter 4, "Mathematical Derivation of Radar Equations", pp. 84, 85.

Primary Examiner—Bernarr Earl Gregory
(74) Attorney, Agent, or Firm—Rick Martin; Patent Law Offices of Rick Martin, P.C.

(57) ABSTRACT

Disclosed is a Doppler shifted radar apparatus for correct target identification with respect to surveillance of moving vehicles. More particularly, an improved radar detection system using two or more continuously transmitted frequencies is used. The multiple frequencies are directed toward target vehicles whereby the phase difference of the two or more reflected Doppler signals is calculated and subsequently used to accurately determine a target range, thereby displaying the closest vehicle and closest vehicle speed. Vehicle speed is determined with use of the standard Doppler frequency shift. The next closest and/or next faster vehicle speed can also be easily determined.

38 Claims, 19 Drawing Sheets

U.S. PATENT DOCUMENTS

| | | |
|---|---|---|
| 5,999,119 A | 12/1999 | Carnes et al. |
| 6,008,750 A | 12/1999 | Cottle et al. |
| 6,008,752 A | 12/1999 | Husk et al. |
| 6,114,987 A | 9/2000 | Bjornholt |
| 6,198,427 B1 | 3/2001 | Aker et al. |
| 6,400,309 B1 | 6/2002 | Jones |
| 6,417,796 B1 | 7/2002 | Bowlds |
| 6,462,702 B1 | 10/2002 | Bowlds |

* cited by examiner

TRAFFIC SURVEILLANCE RADAR USING RANGING FOR ACCURATE TARGET IDENTIFICATION

FIELD OF THE INVENTION

The present invention relates generally to Doppler shifted radar and more specifically to target identification with respect to surveillance of moving vehicles. More particularly, it relates to an improved system using two or more continuously transmitting frequencies directed toward target vehicles whereby the phase difference of the reflected Doppler signals is scaled to a target range. As such the system can detect the speed of each target within a specified range including the closest, the next closer, next faster, fastest closing vehicle, etc.

BACKGROUND OF THE INVENTION

One of the most common and useful tools in the enforcement of vehicular speed limit laws has been the use of Doppler radar. In a Doppler radar system, a microwave signal is transmitted to a vehicle and then reflected off the vehicle. When the reflected signal is received back at the Doppler radar system, a change of frequency in the signal is proportional to the vehicle speed. That shift in signal frequency is known as the "Doppler Effect". The shift in frequency is measured and the resulting vehicle speed is calculated and displayed on the radar system, thereby eliminating any need for calculations for the system operator (police officer) in the vehicle that has the radar system. The radar system may be permanently mounted in the vehicle or the system may be a portable hand-held unit with a display. If a vehicle speed is measured over the speed limit, the officer may pursue the vehicle and issue a speeding ticket.

In actual application, a problem arises when more than one vehicle is in the visual sight of the operator. The problem is the identification of which vehicle's speed is displayed when more than one vehicle is in a position to reflect the microwave signal. Conventional radar is always instructed to display the speed of the "strongest" radar return in the "strongest target window", most often the leftmost window of the radar display. Since the round trip strength of the radar signal drops off at $1/R^4$ (where R is the distance to the target), it can be somewhat assured that the strongest return is also comparable to the closest target. The using system operator will develop a tracking history (speed values over time) and mentally correlate the reading from the actual viewed traffic. When a speed violator has been detected and confirmed (through the tracking history), then the operator may issue a citation.

The originating signal is usually conical shaped and emits a half angle of six degrees. As the range is increased, more vehicles can come within the "measurement cone" and reflect back to the system. The best reflector of the radar is a function of the vehicle design, that is, vehicle size, shape, grills, headlights, bumpers, large flat surfaces, etc. When a plurality of vehicles with various geometric shapes enters a radar area, there may be a situation where the identification of a target vehicle is indeterminate. All of these factors contribute to the problem of reliable vehicle identification.

When citizens come into contact with law-enforcement personnel, it is important that they feel that they have been dealt with in a fair and consistent manner. Thus, it is important that traffic citations be based on factual matter and not be left to any discretion of the law-enforcement officer. Police traffic radar has always suffered from the inability to accurately report the range of, a target object. It has always been taught to system operators that the strongest return corresponds to the closest target. Unfortunately, this only applies to vehicles of the same size, shape, etc. Vehicles that vary significantly in their geometric properties can produce equally varying signal strengths. Common roadway traffic is usually composed of a multitude of vehicle sizes, shapes, etc. ranging from motorcycles, sports cars to large eighteen-wheeler trucks. These varying targets increase the difficulty of correctly identifying the closest vehicle based on signal strength alone.

There are many methods to detect the relative or exact range of target vehicles. These methods include pulsing, modulation of the carrier wave and alternately transmitting more than one carrier frequency towards a target. The pulsing methods have drawbacks with FCC limitations and the modulation methods tend to be more complex and thus more expensive.

The present invention will describe a means that accurately determines the exact or relative range to a target while being relatively inexpensive, stable, and accurate over time and temperature variations. The present invention resolves issues of accurate target identification regarding the radar operator use of discretion when operating the radar system. The present invention will provide a means for the radar operator to correctly identify the closest target in range thereby substantially improving target identification. The present invention utilizes two or more "continuously" transmitting frequencies directed toward the moving target(s) whereby the phase difference of the reflected Doppler signals is scaled to a target range.

SUMMARY OF THE INVENTION

The main aspect of the present invention is to provide for an improved vehicle radar system whereby two or more continuous transmitting frequencies provide for correct identification of the closest target in range, thus improving target identification.

Another aspect of the present invention is to provide the relative range of a target by comparing the phase differences between the Doppler signals.

Another aspect of the present invention is to provide for a longer detection range.

Another aspect of the present invention is to provide for better stability and accuracy over the lifetime of the radar unit.

Another aspect of the present invention is a relatively inexpensive manufacturing cost and compact size.

Another aspect of the present invention is the ability to combine the range and speed.

Another aspect of the present invention, an alternate embodiment, is to provide a speed for a plurality of relative targets coinciding with each targets range.

Another aspect of the present invention, an alternate embodiment, is to report and/or display the relative speeds of the closest, next closest, etc. vehicles.

Another aspect of the present invention is to allow the operator of the radar system to control the display to show the speed of the closest, then switch to the next closest or again next closest vehicle as desired.

Other aspects of this invention will appear from the following description and appended claims, reference being made to the accompanying drawings forming a part of this specification wherein like reference characters designate corresponding parts in the several views.

The present invention employs two or more continuous frequencies and is thus a multiple frequency transmitting radar system (MFTRS). The MFTRS can determine the relative range to a target by comparing the phase differences between the returned Doppler signals. This phase difference is directly proportional to the range of the target. Determination of the relative range of a vehicle will then allow the MFTRS to display the speed of the closest vehicle.

The use of continuous transmission of two or more frequencies overcomes many problems with prior art, which used alternating transmitting signals, thereby introducing errors into a system. Further detail of the MFTRS will be described below.

DETAILED DESCRIPTION OF INVENTION

The MFTRS provides continuous transmitting frequencies for correct identification of the closest target in range (and its speed), thus improving target identification. The transmitting frequencies are phase locked to a reference offset to provide a stable output over time and temperature. The MFTRS utilizes the combining action of these continuous transmission signals and eliminates many errors commonly found in prior art. A combiner circuit takes the transmitted frequencies from two separate microwave sources and combines (adds) them together before being transmitted. The combiner circuit will accurately perform the task while offering low insertion loss and is relatively inexpensive to produce. The use of a combiner allows that the transmitting frequencies originate from one antenna, which has been determined to be a requirement (confirmed by experimental results) due to the Cosine effect, which will be discussed in detail below. Also, with continuous transmitting frequencies, there is far less chance that the frequencies will interfere with other equipment as compared to prior art alternating frequencies.

Prior art have alternately transmitted two or more microwave frequencies from one antenna. That is, radar will transmit one frequency for a brief time and then switch to another alternate frequency. Basic error improvements over the aforementioned methods of prior art include:

A. Cosine effect—The cosine effect causes a radar unit to display a speed, which is lower than the actual target speed. This condition exists when the target vehicle's path is not parallel to the antenna, such as on a curve or hill. As the angle between the radar beam and the target increases, the displayed speed decreases. It is imperative that the Doppler signals from moving targets be compared to each other as simultaneously as possible. That is, readings should be as synchronous as possible. In prior art two or more microwave frequencies have been "alternately" transmitted. The radar system will transmit one frequency for a brief time, (on the order of micro-seconds) and then switch to an alternate frequency for a brief time, then switch back and so on. When one transmitter varies frequency from one frequency to another, "gaps" will exist from one time element of a frequency transmission to that of another frequency transmission. To prevent loss of synchronization, the alternating rate (switching time from one frequency to the other) needs to be very fast, usually on the order of microseconds. Such a high alternating rate can create errors in the transmitters by forcing the microwave oscillator to jump from one frequency to another. Typically, there exists a time space "dead time" to allow stabilization prior to processing. The MFTRS eliminates these issues with the cosine effect since each oscillator is transmitting continuously, and both Doppler signals are sampled at exactly the same instant in time. Thus, there is no "dead time".

B. Range reduction—It is desirable to have good range detection on a police traffic surveillance radar system. Most traffic officers base the quality of the radar system on its range ability. That is longer detection range is equated to better-perceived quality. As in prior art, the alternating of frequencies results in less energy being recovered from the transmitted signal, which reduces the overall detection range. The frequency-alternating rate, as described in "A" above, the dwell time (time on the target) is reduced. This short dwell time reduces the time that the return signal has to overlap and "mix" with the reference frequency of the source oscillator. This short overlap, in turn, reduces the energy that is received and thus reduces the signal to noise ratio of the returned signal. The MFTRS of the present invention eliminates these dwell time issues as the frequencies are continuous and thus there are no dwell time or overlap issues. In addition, both received Doppler's can be averaged together to increase the target detection range.

C. Stability—With prior art, since the frequencies are alternating, there are no safe guards to insure that the frequencies maintain the correct offset over time and/or temperature changes. With the MFTRS of the present invention, employment of continuous frequencies does not have these limitations. The continuous frequencies of the MFTRS can be frequency locked together to provide stability and accuracy over the lifetime of the MFTRS.

Theory of Operation

The following discussion relates to the theory of For a dual transmitting device the maximum unambiguous range is given as:

$$U_r = C/(2 * \Delta f)$$

Ref: RADAR SYSTEM DESIGN and ANALYSIS" by S. A. Hovanessian copyright 1984 ARTECH HOUSE, INC. Chapter 4 "Mathematical Derivation of Radar Equations", Pgs 84, 85

Where: $U_r$ is the unambiguous range;

C is the speed of light (186,282 miles/sec);

$\Delta f$ is the frequency of separation between the two transmitted frequencies; and "*" is a multiplication symbol.

Assuming that a frequency of separation, $\Delta f$, is 200 KHz, the maximum unambiguous range, $U_r$, would then be approximately 2459 feet. Decreasing $\Delta f$ to 100 KHz would double $U_r$ to give close to a mile of unambiguous range. The MFTRS transmits the two frequencies and computes the phase difference of the returned Doppler signals to calculate the target range. The phase difference is measured and scaled to a target range. Obviously, increasing the difference frequency improves the resolution of the detected range, however the unambiguous range is decreased.

The received Doppler signals are processed via a "Fast Fourier Transform" (FFT). The FFT produces a spectrum that ranges from zero Hz in frequency (DC value) upward in frequency limited to the sampling rate divided by two. A typical sampling rate is 46,875 Hz for Ka-band operation and 31,250 Hz for K-band operation. The sampling rate is not important as long as the rate is twice that of the highest frequencies expected.

The target vehicle speed is calculated from the frequency spectrum by using the Doppler shift for that particular band. The K-band frequency of operation is 24.050 GHz to 24.250

GHz and the Ka-band frequency of operation is 33.4 GHz to 36.0 GHz. The Doppler shifts are about 72.038 Hz per mile per hour for the K-band (centered on the band–24.150 GHz) and about 105.9 Hz per mile per hour for the Ka-band (centered at 35.5 GHz). The MFTRS can operate using either K-band or Ka-band depending on the end user requirements. Ka-band would be the preferred operational band.

For example, if the antenna is transmitting at the Ka-band and a vehicle is traveling at 100 mph its Doppler shift will be 105. 9 Hz/mph multiplied by 100 mph or 10590 Hz frequency shift.

The phase information of each target vehicle is revealed by the imaginary and real values of the FFT at that particular target location. The phase difference information is calculated by:

$$\Phi_1 = \text{Tan}^{-1}\, \text{Imag}_{ch1}/\text{Real}_{ch1}$$

$$\Phi_2 = \text{Tan}^{-1}\, \text{Imag}_{ch2}/\text{Real}_{ch2}$$

$$\text{Phase Difference} = \Delta\Phi = |\phi_1 - \phi_2|$$

The phase difference information is calculated for each target and used to classify the relative distance (range) between the MFTRS and the target vehicle. The range is calculated with the equation:

$$R_{calc} = (c * \Delta\Phi)/(4\Pi * \Delta f)$$

Ref: RADAR SYSTEM DESIGN and ANALYSIS" by S. A. Hovanessian copyright 1984 ARTECH HOUSE, INC. Chapter 4 "Mathematical Derivation of Radar Equations", Pgs 84, 85

Where $R_{calc}$ is the calculated target range;

c is the speed of light;

$\Delta\Phi$ is the phase difference between the two Doppler signals; and $\Delta f$ is the frequency of separation (or frequency difference) between the two transmitted frequencies.

The use of two frequencies thus provides the ability to calculate the range of each target and determine the closest target thereby displaying correct identification of a target speed and overcoming prior art, which displayed the strongest target (which is not necessarily the closest target as previously discussed). A typical minimum frequency difference is about 100 kHz.

Once all of the potential targets have been classified, they are sorted based on the range (phase information) and then sorted from closest to farthest for display by the MFTRS. Although the preferred embodiment of the present invention is to display the "closest" vehicle speed, alternate embodiments can easily display a plurality of vehicle speeds starting with the "closest" then the "next closest" and so on. In addition to phase information, amplitude information and frequency information is also saved for each of the targets detected. It should be noted that increasing the number of data points that are taken could increase the resolution of the target speed and phase information. Increasing the FFT size can improve the frequency resolution of each target.

Although only one frequency is required to calculate target speed, the second of the two transmitted frequencies can also provide a calculation as to the second Doppler speed from the same target. This "second" speed can be used by the MFTRS to self-detect any out of specification conditions.

The MFTRS apparatus of the preferred embodiment of the present invention is compact as is described in the following description. The MFTRS contains two antennae, one for the front and one for the back of the user vehicle. The MFTRS contains a computer and display unit, which can be separated for space saving if required. The computer and display unit interconnect with a simple 9-pin connector (and 9-pin cable if physical separation is desired). The computer/display, or display unit alone, can easily be mounted on a dash for easy readability. The hand remote controller connects to the computer unit via a quick disconnect tethered cable. A power connector also plugs into the computer unit at one end and an auxiliary cigarette lighter plug on the other end. Each front and rear antenna also connects into the computer unit. The handheld remote controller activates either the front or the rear antenna (it is also possible to only mount one antenna). A serial communications port (COM) is also provided to allow the MFTRS to communicate with other devices such as PC's, speed signs, in-car video systems, etc. It should be noted that although a tethered remote control is described above as the preferred embodiment, a non-tethered remote control could also be used.

The display section of the preferred embodiment of the MFTRS would contain four windows for the operator display:

1. The first (leftmost) target speed window would contain the "closest" or target vehicle speed. Underneath the first window could be a set of LED's to show the relative range of the vehicle. That is, the number of LED's lit would be a function of the target vehicle's relative range.
2. The second window would be a locked window. The operator would enter a "lock" key on the handheld remote to lock a target speed into the "lock speed" window, which can be later "cleared" by operator entry. Under the lock window there are two LED's to indicate whether the "front" or "rear" antenna is transmitting.
3. The third window would be a "mode" window to display the mode of operation. It would show stationary mode, moving mode same direction, moving mode opposite direction. This window would also be used to display error messages such as handheld remote not connected (RMT?), low voltage (LowV), system failure (SYS), etc.
4. The fourth window is used to display the patrol car speed. This window would be used in moving mode to give the operator a visual check with the patrol car speedometer to offer assurance that the MFTRS is functioning properly.

It should be noted that the order in which the windows are manufactured could be changed as required.

Again, although the preferred embodiment of the MFTRS would display only the closest vehicle speed, alternate embodiments of the MFTRS could easily visually display a series of target data if required. There are many combinations of alternate embodiments that can be employed in the packaging of the MFTRS. For example, the MFTRS can have a plurality of windows to display target "one" as the closest target, displaying its range (if desired) and speed, target "two" as the next closest target, displaying target two's range (if desired) and speed, then display target "three" with its data, then target "four" and so forth.

Within a plurality of display windows, another alternate embodiment would be to have the display programmed to highlight the "fastest" target within a certain range (1000 feet, for example) displayed and its order of occurrence in the visual field. Yet another embodiment could have a button that had "next faster" on it and, upon pressing this button, the radar would display the next target, which is the next target which is faster. Another embodiment could employ, for example, a flash frequency, then highlight the "next faster" target with a slower flash frequency.

If a display were as the aforementioned preferred embodiment with four windows, an alternate embodiment of the display could also be set up to show the speed of the closest vehicle and allow the MFTRS operator to switch the display to either the "next closest" or to the "next faster" of the vehicles within range. There could also be an operator input to allow the speed display (leftmost window) to indicate only approaching or moving away vehicles to separate roadway traffic in the display.

Range options for alternate embodiments could include actual range display (in feet, miles, meters, etc.) or display a moving bar (bar would decrease in length as the vehicle approached or increase in length as the vehicle moved away). Other options would be to display an arrow to indicate the moving direction of the target (approaching or moving away). Although the actual range could be displayed, it is felt that providing the operator with too many numerical options would only lead to confusion if displaying a multiple of variables.

The MFTRS provides a relative targets' speed. Again, it can include range, a bar indicator, or directional arrow if desirable. The MFTRS can also link with a visual display apparatus (monitor, camera, etc.) in order to link and attach the range/speed with each target. The MFTRS can be packaged as a stationary mount with an operator vehicle or as a handheld device.

The computer unit contains all of the electronics including the digital signal processor (DSP), memory, oscillators, regulators, amplifiers, filters, isolators, circulators, connectors, etc. The logic will be described below. The connectors include a power input connector, front and rear antenna connectors, a communication port and a connector to the remote handheld.

The handheld remote controller is connected to the computer unit. It would comprise of a small built-in speaker and have the following buttons:

a. Power (PWR) button for activating the MFTRS.
b. Front antenna and a rear antenna buttons (Up/Down) to activate or deactivate the front and rear antenna. Only one antenna is allowed to be in the active state at one time.
c. A target lock button—when hit it will transfer the target speed from the "closest" window and lock it into the "lock" window. The "closest" window would continue to track the target speed;
d. A mode button to switch between stationary mode, moving mode opposite-direction, and moving mode same-direction.
e. A test button for self-test and diagnostics of the MFTRS.
f. A squelch button to allow the user to select the type of Doppler audio sound heard. The user can select the target's Doppler or other sounds.
g. A toggle range button (+/−) to allow the user to decrease or increase the target acquisition distance.
h. A toggle volume (+/−) button to allow the user to control the Doppler audio volume and the system "beep" volume.
i. A City/Highway option button to allow the MFTRS to track minimum slow versus fast speed. The speed limitations can be set depending on user requirements.
j. An optional fast button to allow the user to track the next faster target.

It should be noted that, in the aforementioned description, the remote handheld is for purposes of illustration and that there are many combinations and layouts of a handheld that would function to provide adequate MFTRS operation.

General Operation:

1. Power Up the Unit—a self test starts and will display a Test Pass or a System Error in the mode window.
2. Upon power up the mode will contain an "Ant?" asking the user to select the front or rear antenna from the handheld buttons. Once an antenna is selected, an LED will indicate which antenna has been selected.
3. The mode window will show which mode is selected:
    a. Stationary—a bar will show that the MFTRS is in stationary mode and one of two arrows will show the target direction (toward or away).
    b. Moving mode opposite direction—a leftmost downward arrow and a rightmost upward arrow indicates the moving mode opposite direction.
    c. Moving mode same direction—the mode window will display two upward arrows indicating both vehicles moving in the same direction.
4. Pushing the lock button will transfer a target speed into the target lock window while continuing to monitor the target speed in the target speed window.
5. Clear the lock as required by hitting the lock button when the antenna is transmitting, changing the mode, or turning the antenna off and on again.

While the above is a simple description of the apparatus and operation thereof, there are other embellishments of the display, handheld, etc. that can be manufactured depending on user requirements.

The drawings to follow will show the circuitry and logical flow of signal and signal processing components.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
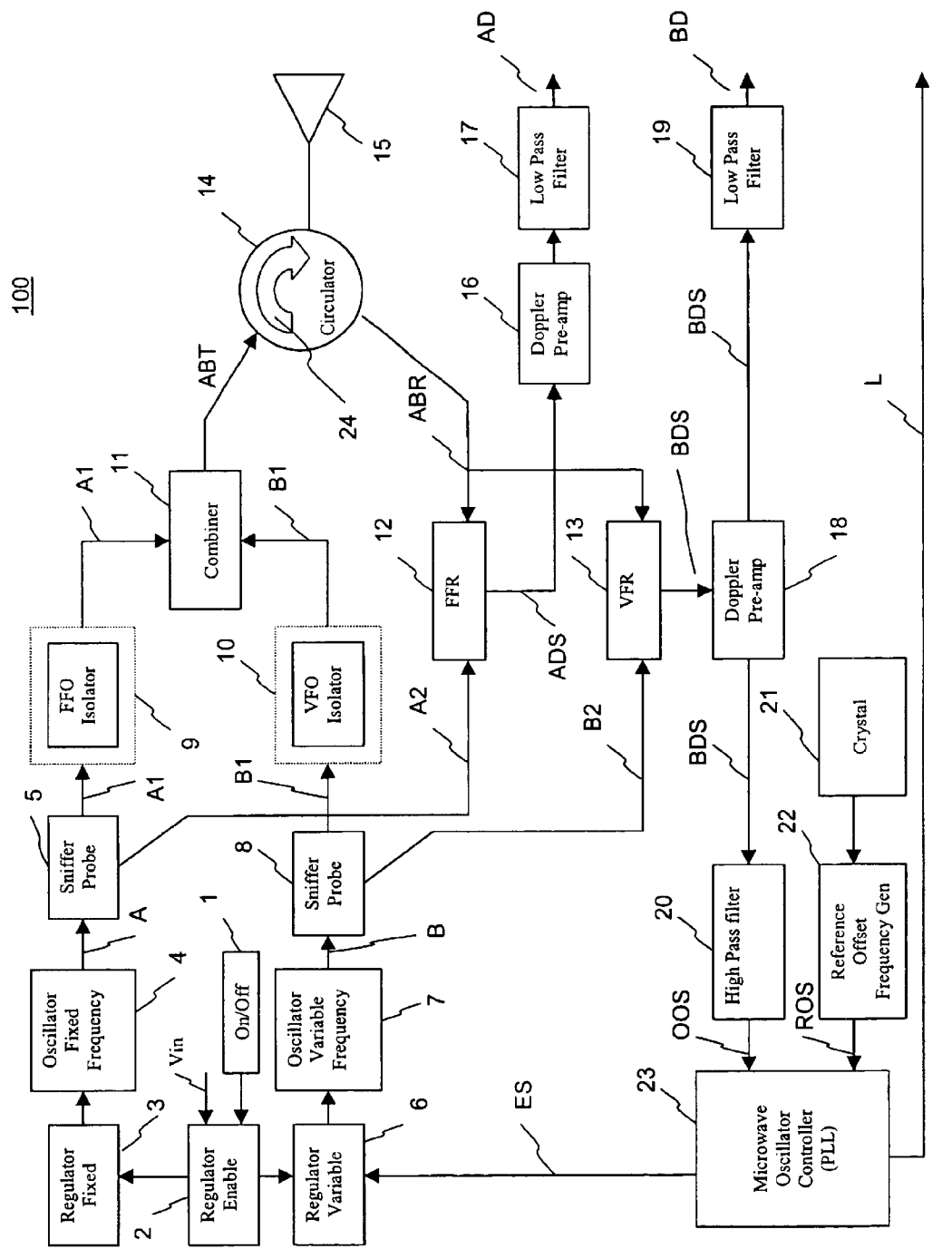
FIG. 1 is a block diagram of the transmitter/receiver circuit section of the preferred embodiment of the MFTRS of the present invention.

FIG. 1 is a block diagram of the transmitter/receiver section 100 of the preferred embodiment of the present invention. Upon the MFTRS being turned 'on' with power switch 1, the antenna and oscillators 4, 7 are activated. Enable regulator 2 controls the turn-on of fixed regulator 3 and variable voltage regulator 6. Fixed voltage regulator 3 supplies voltage to FFO (fixed frequency oscillator). 4, whereas variable regulator 6 supplies a variable voltage to VFO (variable frequency oscillator) 7 depending on the input from microwave oscillator controller 23 (which will be explained below). Both FFO 4 and VFO 7 operate within the same frequency range band. That is, they would either both operate in the Ka-band or both operate in the K-band. Both FFO 4 and VFO 7 are connected to their respective sniffer probes 5, 8. Each sniffer probe 5, 8 divert some energy from respective FFO 4 and VFO 7 to FFR (fixed frequency receiver) 12 and VFR (variable frequency receiver) 13 respectively. The functions of FFR 12 and VFR 13 will be explained below. Sniffer probes 5, 8 also send energy into respective FFO isolator 9 and VFO isolator 10. Sniffer probe 5 splits FFO output A into two signals A1 and A2 which are the identical frequency as A. Likewise, sniffer probe 8 splits VFO output B into two signals B1 and B2 which are the identical frequency as B. FFO isolator 9 and VFO isolator 10 are optional features and both function to add extra isolation between the two channels preventing any signal feedback into sniffer probes 5, 8 respectively. Combiner 11 receives both oscillator signals A1, B1 and combines the two separate frequencies in magnitude to form complex ABT transmit signal. Signal ABT is then fed into circulator 14, which routs ABT to antenna 15, Circulator 14 functions as a form of 'multiplexer' in directing input energy to the nearest output in the direction of arrow 24.

External energy received by antenna 15 enters circulator 14 and is routed around circulator (arrow 24) to exit as signal ABR. Signal ABR is a complex signal as originated by ABT but is also effected by the received Doppler shift from transmit signal ABT as received back by antenna 15. FFR (fixed frequency receiver) 12 and VFR is (variable frequency receiver) 13 receive signal ABR. Each receiver, FFR 12, and VFR 13 are conventional microwave mixer designs that "mix" or compare receive signal ABR with each respective original source input frequency A2, B2 provided by each respective sniffer probe 5, 8. Each receiver, FFR 12, and VFR 13 extracts each Doppler frequency associated with the target(s) speed in the transmitted radar beam plus the oscillator offset (the difference in FFO 4 and VFO 7 frequencies) from the incoming ABR signal frequencies.

Thus the output of FFR 12 is frequency signal ADS which is a combined FFO Doppler and oscillator offset signal. Likewise the output of VFR 13 is frequency signal BDS which is a combined VFO Doppler and oscillator offset signal.

Signal ADS is sent to Doppler pre-amp 16, the output of which is sent to low pass filter 17. Low pass filter 17 extracts from ADS the oscillator offset such that its output FFO Doppler signal AD contains only the FFO Doppler frequency. Further processing of FFO Doppler signal AD will be discussed below in FIG. 2.

Signal BDS is sent to Doppler pre-amp 18. Doppler pre-amp 18 sends signal BDS to low pass filter 19. Low pass filter 19 extracts from BDS the oscillator offset such that it's output VFO Doppler signal BD contains only the VFO Doppler frequency. Further processing of VFO Doppler signal BD will be discussed below in FIG. 2.

It should be noted that an offset comparator circuit (not shown) could be supplied as a diagnostic feature. If FFO Doppler signal AD frequency were tested, to be different from VFO Doppler signal BD by some pre-determined amount, then a system error could be detected and reported as FFO Doppler signal AD and VFO Doppler signal BD should be virtually identical.

Continuing, a second output leg of Doppler pre-amp 18 sends signal BDS to high pass filter 20. High pass filter 20 extracts VFO Doppler signal BD and outputs only oscillator offset signal OOS. OSS enters microwave oscillator controller 23. Crystal 21 inputs reference offset frequency generator 22. Reference offset frequency generator 22 has a reference offset signal ROS which also enters microwave controller 23. Microwave oscillator controller 23 monitors OOS and compares both OOS and ROS and then applies error signal ES to variable voltage regulator 6. Variable voltage regulator 6 then adjusts voltage (up or down) to VFO 7 to control and reference offset frequency in order to maintain a constant offset frequency between VFO 7 and FFO 4.

Microwave oscillator controller 23 also outputs a internal latched logical lock signal L. Lock signal L is used to alert the processing unit that the frequency between the two oscillators is correct and locked (or incorrect and unlocked). When lock signal L is at a logical high, it indicates that the frequency offset between the two oscillators is correct and locked. When lock signal L is at a logical low it indicates that the frequency offset is incorrect and signals are un-locked. If both a front and a rear antenna are used, the circuitry of FIG. 1 is duplicated for each antenna.

Figure 2:
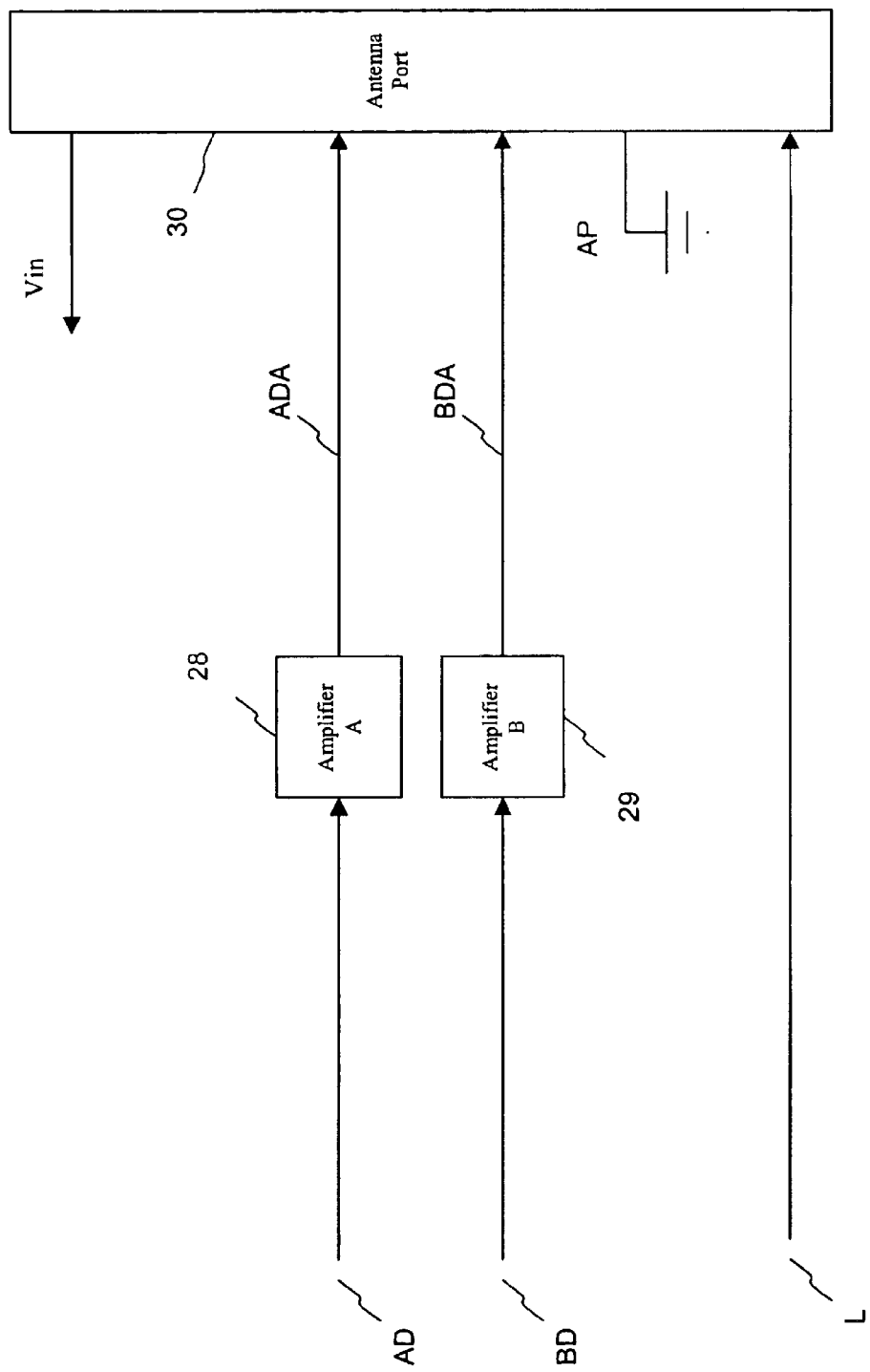
FIG. 2 is a block diagram of the output of the transmitter/receiver section of FIG. 1 amplified to an antenna port.
Figure 3:
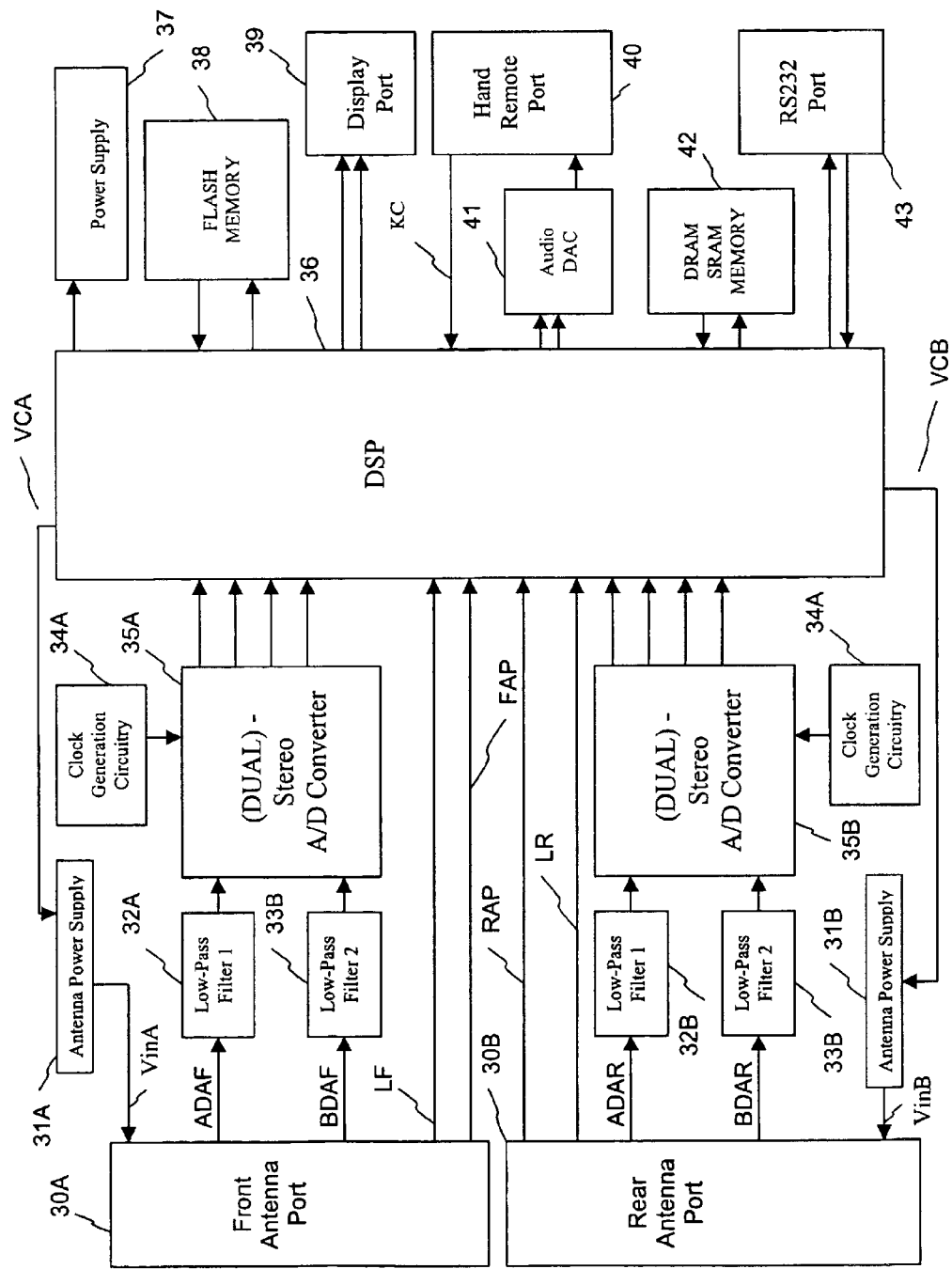
FIG. 3 is a block diagram of the MFTRS digital signal processing (DSP) unit and DSP interfaces.

FIG. 2 is a block diagram of the output of the transmitter/receiver section of FIG. 1 amplified to antenna port 30. FFO Doppler signal AD is amplified via amplifier-A 28 becoming ADA (AD-amplified) and VFO Doppler signal BD is amplified via amplifier-B 29 becoming BDA (BD-amplified). Both Doppler amplified signals ADA, BDA and lock signal L are sent to antenna port 30 which is an electrical connector interfacing with digital processing circuitry, which will be discussed below. Antenna power supply signal Vin is outputted through antenna port 30 and originates from the digital processing circuitry (FIG. 3). Antenna power supply signal Vin is fed into regulator enable 2 (FIG. 1). Regulator enable 2 monitors antenna power supply signal Vin enabling the FFO and VFO oscillators if the voltage supply is approximately 7.2 VDC or higher and disabling the FFO and VFO oscillators if the voltage is below 7.2 VDC. If both a front and a rear antenna are used, the circuitry of FIG. 2 is duplicated for each antenna. Signal AP is a ground signal to enable a digital processing unit (to be described below) to detect the presence of antenna port 30, if an antenna is present.

FIG. 3 is a block diagram of the MFTRS digital signal processing (DSP) unit 35 and various DSP interfaces.

FIG. 3 is expanded from FIG. 2 above to show both a front antenna port 30A and a rear antenna port 30B, which are both connectors connecting to an antenna port 30 (FIG. 2) connector from a front or rear antenna respectively. Each antenna port 30A, 30B connects input signals ADA, BDA, L and AP and output Vin from a respective front or rear antenna port 30 (see FIG. 2 above). A suffix F or R is added herein to each ADA, BDA, L, AP and, Vin signal to signify its source or destination, "F" suffix for front antenna and "R" suffix for rear antenna. Signals ADA and BDA can be composite signals reflected from a plurality of targets.

The front antenna signal processing will be explained, as the rear antenna signal processing is similar. FFO Doppler signal ADAF and VFO Doppler signal BDAF are routed through low pass filters 32A, 33A to remove any residual high frequency and noise signals prior to them being applied to dual stereo analog-to-digital (A/D) converter 35A which is a sigma delta type converter. The Sigma delta type converter is one that has a very high over, sampling action that helps to eliminate expensive low pass circuitry. Because the sampling rate is so high, a sigma delta type converter is limited to lower frequency operation, which is very suitable for audio and Doppler radar devices. Clock generation circuitry 34A is coupled to A/D converter 35A and sets the sampling rate of the Doppler signals ADAF, BDAF for the system. A typical sampling rate is 46875 HZ for Ka-band operation and 31250 HZ for K-band operation. The sampling rate is not important as long as the rate is twice that of the highest frequencies expected. A/D converter 35A outputs digitized signals into Digital Signal Processor (DSP) 36 for further processing. The resolution of A/D converter 35A should be a minimum of 16 bits but could be higher depending on the sensitivity required and overall gain of the system. The output of A/D converter 35A is an industry standard serial format, which includes the data line, the serial clock, a frame synch and a channel (left or right) selection line. A/D converter 35A samples both channels of the signal at the same time thus guaranteeing correct synchronization across both channels. A typical sampling rate is 46875 samples per second for Ka-band operation (the preferred band) and is set from the external clock. Front antenna present PAP signal is a logic level signal that is normally at logic high with a pull-up resistor until an antenna is connected to front antenna port 30A wherein a connected antenna present AP signal (see FIG. 2) will pull FAP to a logical low and DSP 36 would then detect a connected antenna condition. Rear antenna port 30B and respective circuitry into DSP 36 is a duplicate of the aforementioned front antenna port 30A and thus will not be described herein as it is identical to the aforementioned circuitry of the front antenna port. Only one antenna port will be active at any given time.

Continuing with FIG. 3, DSP 36 controls all of the main functions of the MFTRS. In the preferred embodiment of the present invention, DSP 36 is a 32-bit device that is coupled to the antenna units by A/D converters 35A and/or 35B. Each A/D converter represents one antenna (either a front or rear) and only one antenna will be active at any given time. Flash memory 38 is coupled to DSP 36 via the data and address bus and is a conventional type and holds software and code, data tables and parameters needed for program execution. Flash memory 38 is also used to store operational parameters upon power down. Flash memory 38 can be re-programmed via RS232 input port 43 if required for program changes, etc. Dram/Sram memory 42 is of conventional type and is used to hold program memory (loaded from flash memory 38) during execution. Audio DAC (digital to analog) converter 41 converts the Doppler sound digital output from the software audio filters to Doppler sound analog signals for the MFTRS system user (typically a traffic officer). When a target has been detected the digital band pass filter is positioned at the target frequency. DAC 41 converts the digital signal to an analog signal. The Doppler audio will increase in frequency as the target vehicle speed increases. The output of Audio DAC converter 41 is routed to hand-held remote port 40 where sound is produced. Hand-held remote port 40 output signal KC is a carries keyboard commands to DSP 36 via a serial stream. Display port 39 allows visual display of target information and is connected to a serial output port of DSP 36. RS232 port 43 is connected to DSP 36 for communication with external peripheral devices. For example, RS232 port 43 can be used for uploading program code changes as aforementioned, or can be used to connect the MFTRS system to an external stand alone street side road speed sign, etc. Power supply 37 converts an automotive (or other) input voltage to various output voltages as needed by the MFTRS and enables or disables the microwave oscillators in the antennas depending on DSP 36 control input to power supply 37. DSP 36 thus uses the Doppler signal inputs from the active antenna to calculate both the speed and relative distance of a target using the previously mentioned calculations.

Thus DSP 36 functions to:
A. Receive data from A/D converters 35A, 35B (only one is active at any given time).
B. Enable or disable microwave oscillators in the antennae by controlling power supply 37.
C. Receive the microwave oscillator lock signal L from the antenna.
D. Performs a FFT to determine the spectral content of each of the digitized Doppler signal inputs and determine the phase relationship and convert each target to a respective target range.
E. Determine the target speed from the Doppler frequency for each respective target.
F. Read/Write to flash memory 38.
G. Communicate to display port 39.
H. Send a digitized Doppler signal to audio DAC 41.
I. Communicate to external equipment via RS232 port 43.
J. Utilize Dram/Sram memory for running programs and storage of variables and data.

Figure 4:
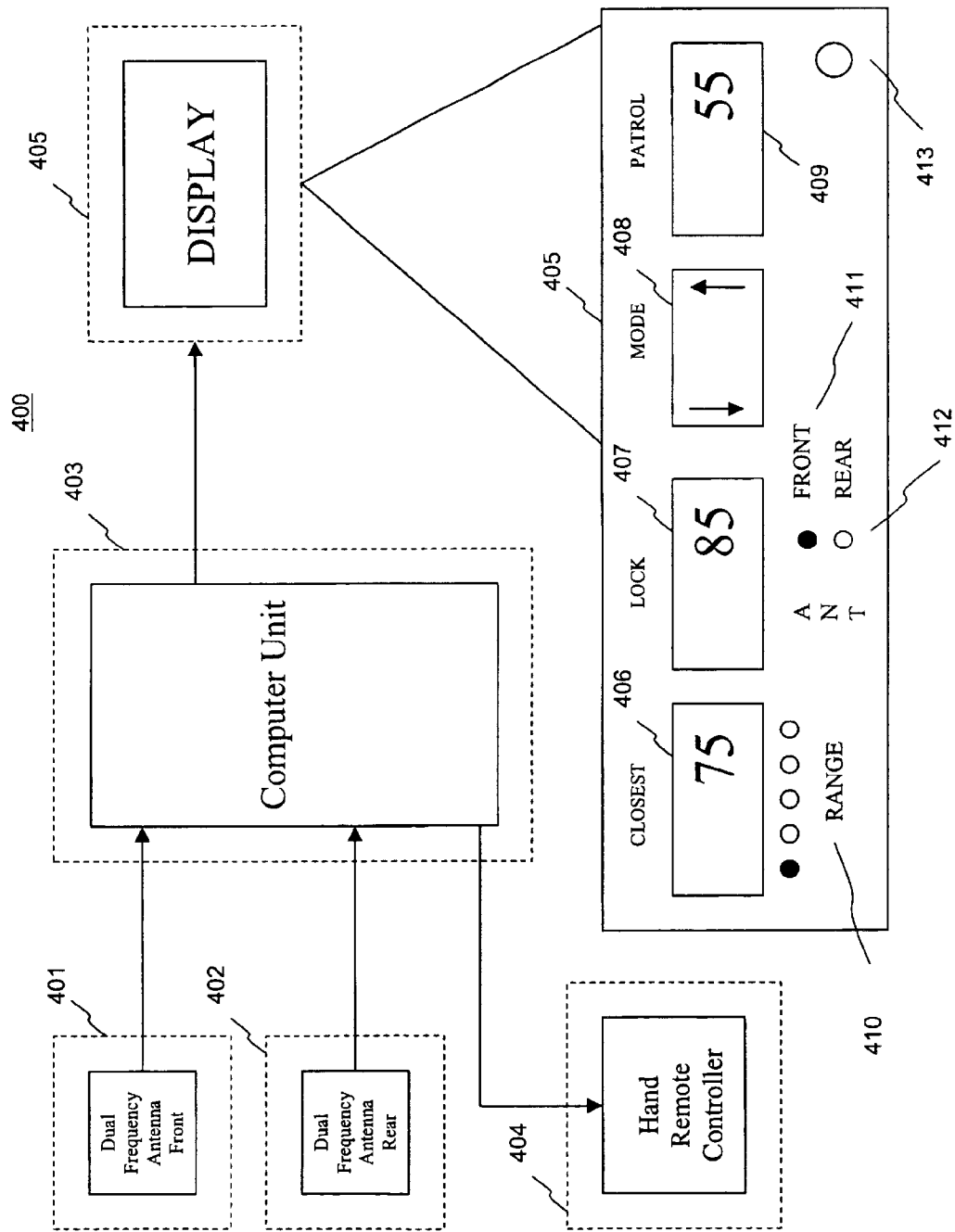
FIG. 4 is an illustrative diagram of the MFTRS system with components.

FIG. 4 is an illustrative diagram of the MFTRS system 400 with components. Dual frequency antenna front 401, dual frequency antenna rear 402, and handheld remote controller 404 connect to respective input ports on computer unit 403. Display 405 connects to an output port of computer unit 403. Display 405 consists of four windows, closest (or target) window 406, lock window 407, mode window 408 and patrol (speed) window 409. In the illustration shown closest window 406 shows a target speed of 75 mph whereas a previous closest target speed was locked at 85 mph shown in lock window 407. Mode window 408 shows the unit in 'moving mode opposite direction' (arrows pointing in opposite directions) and patrol window 409 shows the patrol vehicle speed at 55 mph. Other LED indications can consist of five 'range' LEDs 410, which show the relative range of the closest vehicle (one LED active indicating the target vehicle is relatively close), a 'front LED' 411 activated (front antenna transmitting), a 'rear LED' 412 inactive (rear antenna not transmitting), and a power indicator LED 413 activated to show system power 'on'. It should be noted that other embodiments of the present invention could embellish the same functional displays through other display designs. Computer unit contains aforementioned circuitry including DSP 36 (FIG. 3).

Figure 5A:
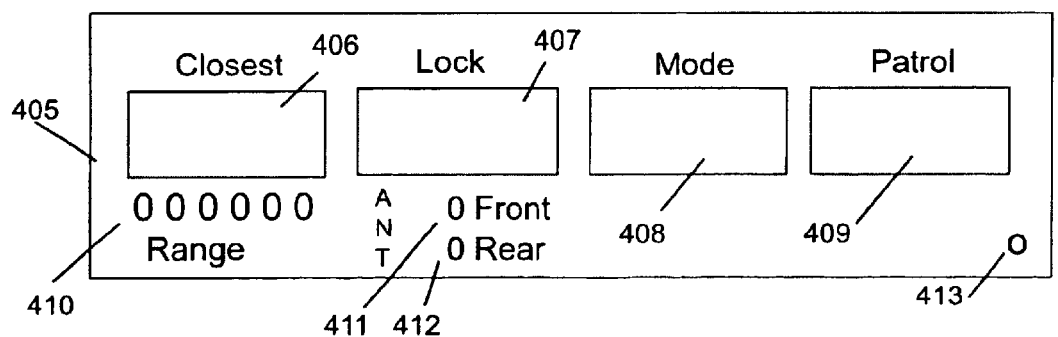
FIG. 5A is a front view illustration of the MFTRS display.

FIG. 5A is a front view illustration of MFTRS display 405 and is similar to the MFTRS display 405 as described above in FIG. 4 except no displays are shown in the windows and no LEDs are activated. Display 405 consists of four windows, closest (or target) window 406, lock 407, mode 408 and patrol 409. Other LED indications consist of five 'range' LEDs 410, which show the relative range of the closest vehicle, 'front LED' 411, 'rear LED' 412, and a power indicator LED 413.

Figure 5B:
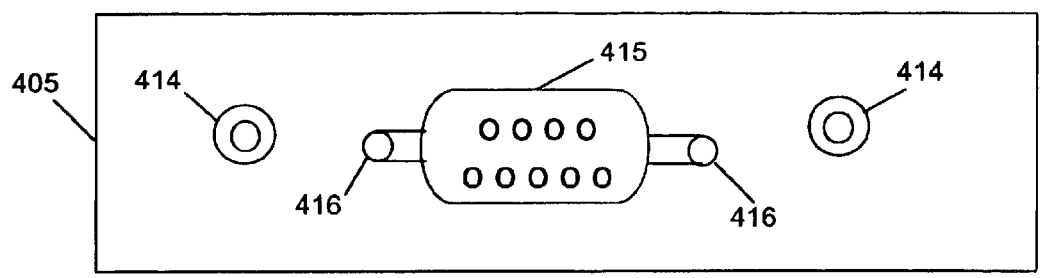
FIG. 5B is a rear view illustration of the MFTRS display.

FIG. 5B is a rear view illustration of the MFTRS display 405. MFTRS display 405 contains two male pressure connectors 414 for connecting MFTRS display 405 directly into MFTRS computer unit 403 (see FIG. 5A below). 9-pin display communications male connector 415 can directly attach to computer unit 403 and contains two cable screw receptacles 416 for use when a cable separates and connects MFTRS display 405 and computer unit 403.

Figure 6A:
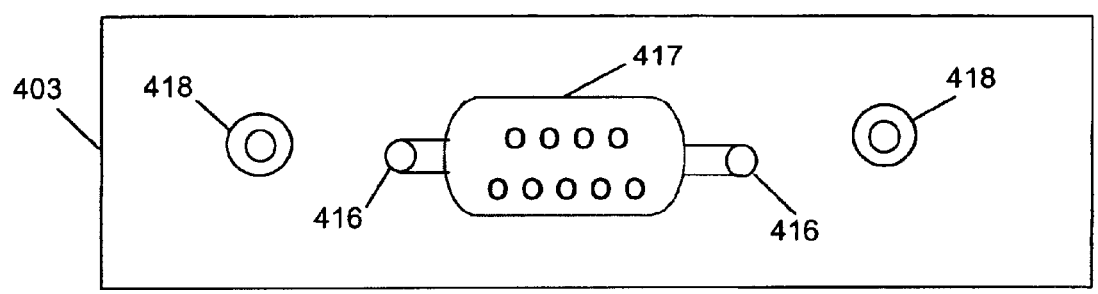
FIG. 6A is a front view illustration of the MFTRS computer unit.

FIG. 6A is a front view illustration of the MFTRS computer unit 403. MFTRS computer unit 403 contains two female pressure receptacles 418 for connecting MFTRS display 405 directly into MFTRS computer unit 403. 9-pin female connector 417 for display port communications (ref. FIG. 3) directly attaches MFTRS display 405 to computer unit 403 and contains two cable screw receptacles 416 for use when a cable separates and connects MFTRS display 405 and computer unit 403.

Figure 6B:
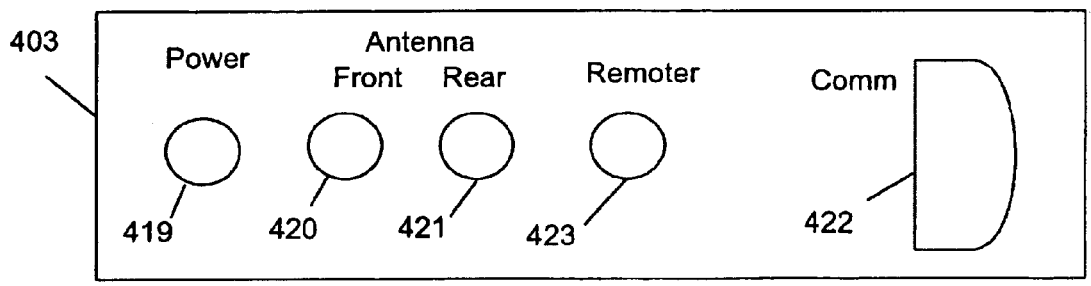
FIG. 6B is a rear view illustration of the MFTRS computer unit.

FIG. 6B is a rear view illustration of the MFTRS computer unit 403. A 12-volt power connector 419 allows power in via an auxiliary or standard vehicle cigarette lighter cable. Front antenna port connector 420 and rear antenna port connector 421 allow antenna connections. A communications cable RS232 connection 422 allows for optional connection with a video system, PC, etc. The RS232 connector can be a D-connector (shown and usually 9-pin) or another type of RS232 connector. Remote connector 423 allows connection with handheld remote controller 404 (see FIG. 4). It should be noted that connector pins are not shown and that all connectors may vary in physical style depending on the design implementation.

Figure 7:
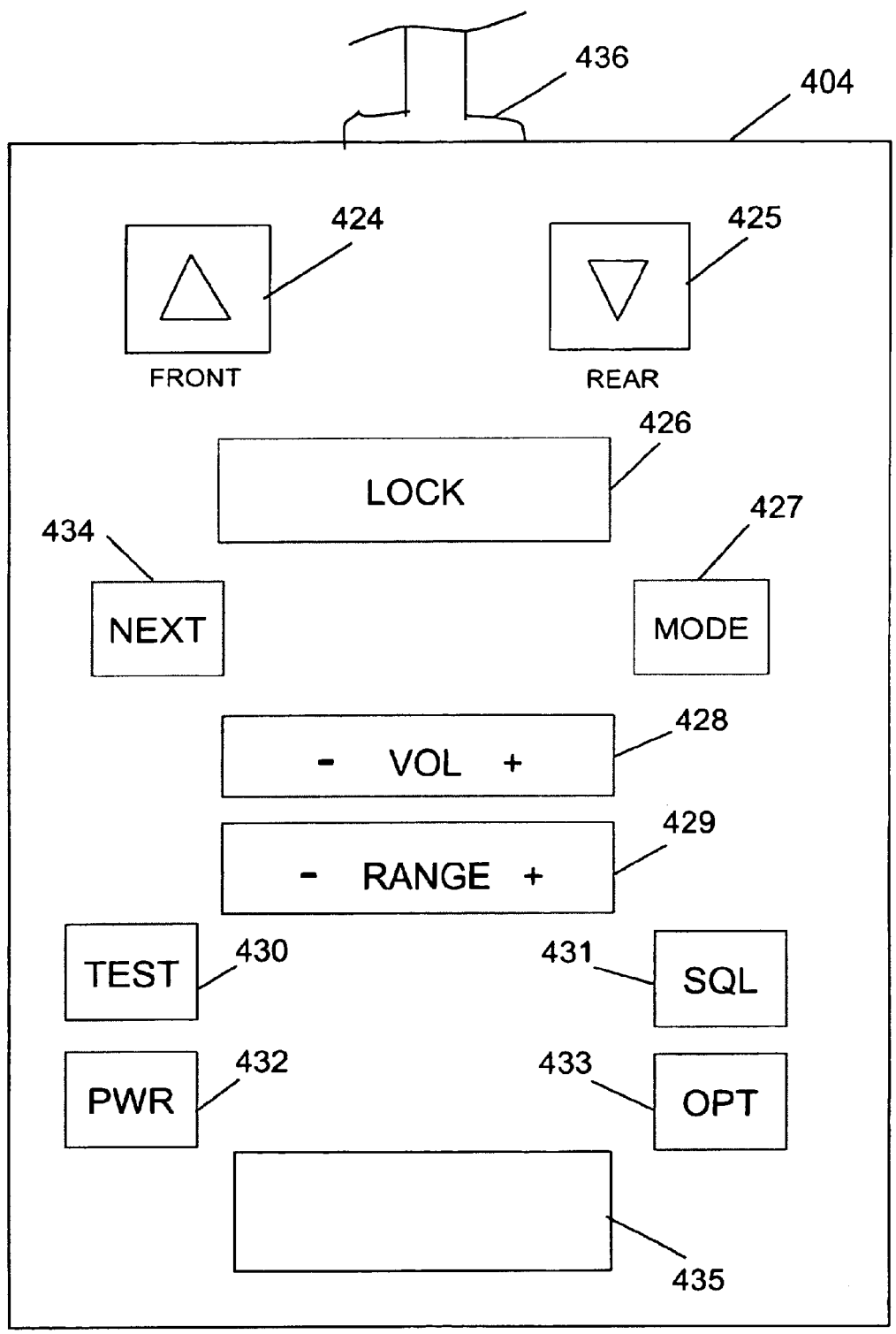
FIG. 7 is a front view of the handheld remote controller.

FIG. 7 is a front view of handheld remote controller 404. Handheld remote controller 404 is connected to computer unit 403 via handheld remote cable 436 and has a small built-in speaker 435 along with the following buttons:

A. Power (PWR) button 432 for activating the MFTRS.
B. Front antenna 424 and a rear antenna 425 buttons to activate or deactivate the front and rear antenna. Only one antenna is allowed to be in the active state at one time.
C. Target lock button 426—when entered, the target speed is transferred from the "closest" window (FIG. 4A) and locked it into the "lock" window (FIG. 4A).
D. Mode button 427—functions to switch between stationary mode, moving mode opposite direction, and moving mode same direction.
E. Toggle volume (+/−) button 428—functions to allow the user to control the Doppler audio volume and the system "beep" volume.
F. Toggle range button (+/−) 429—functions to allow the user to decrease or increase the target acquisition distance.
G. Test button 430—allows for self-test and diagnostics of the MFTRS.
H. Squelch (SQL) button 431—functions to allow the user to select the type of Doppler audio sound heard. The user can select the target or all other Doppler sounds.
I. Next button 434 is used to display the "next closest" vehicle speed into the target window.
J. Button 433 could function in alternate embodiments for other functions such as but not limited to:
  1. Next faster to place the next faster vehicle into the target window.
  2. Fastest target in a certain range, 1000 feet for example. In this case the radar would pick the fastest target within range to display into the target window.
  3. City/Highway option button to allow the MFTRS to track minimum slow versus fast speed. The speed limitations can be set depending on user requirements.
  4. Other functions as required.

It should be noted that although only one optional button is shown, handheld remote controller 404 could easily be redesigned for more input buttons or other design configurations. It should also be noted that handheld remote cable 436 could be replaced with a cable-less signal as technology permits.

Figure 8:
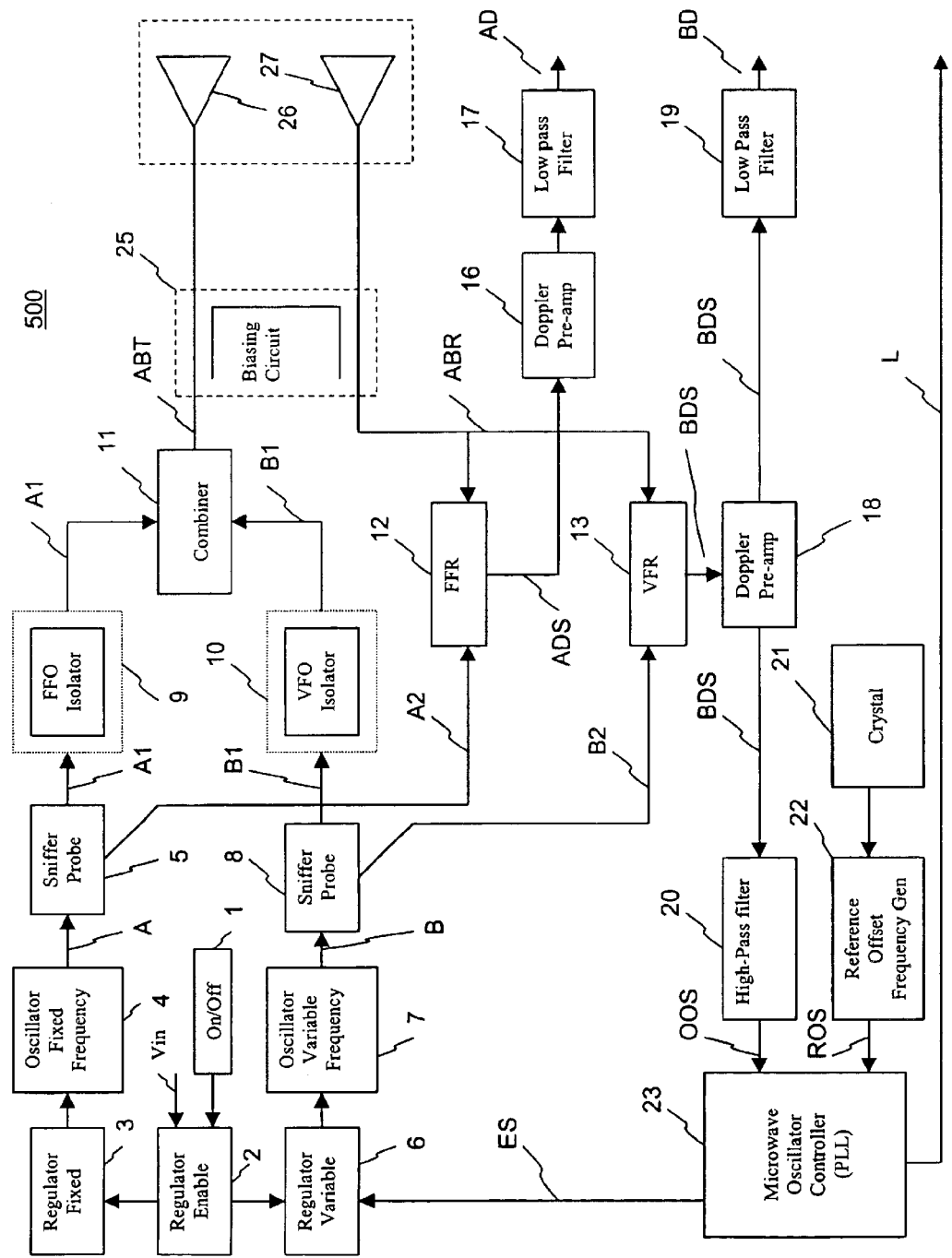
FIG. 8 is a block diagram of an alternate embodiment of the present invention showing an alternate configuration of the transmit/receive section of the MFTRS.

FIG. 8 is a block diagram of an alternate embodiment of the present invention showing an alternate configuration of the transmit/receive 500 section of the MFTRS. FIG. 5 is similar to FIG. 1 with the exception of biasing circuit 25, which has replaced circulator 24 (FIG. 1) and two discrete antennae, transmit antenna 26 and receive antenna 27. Both antennae can be packaged together with one cable. Biasing circuit 25 couples part of the energy from the transmitter section over to the receiver side to function in receiving the difference frequency.

Figure 9:
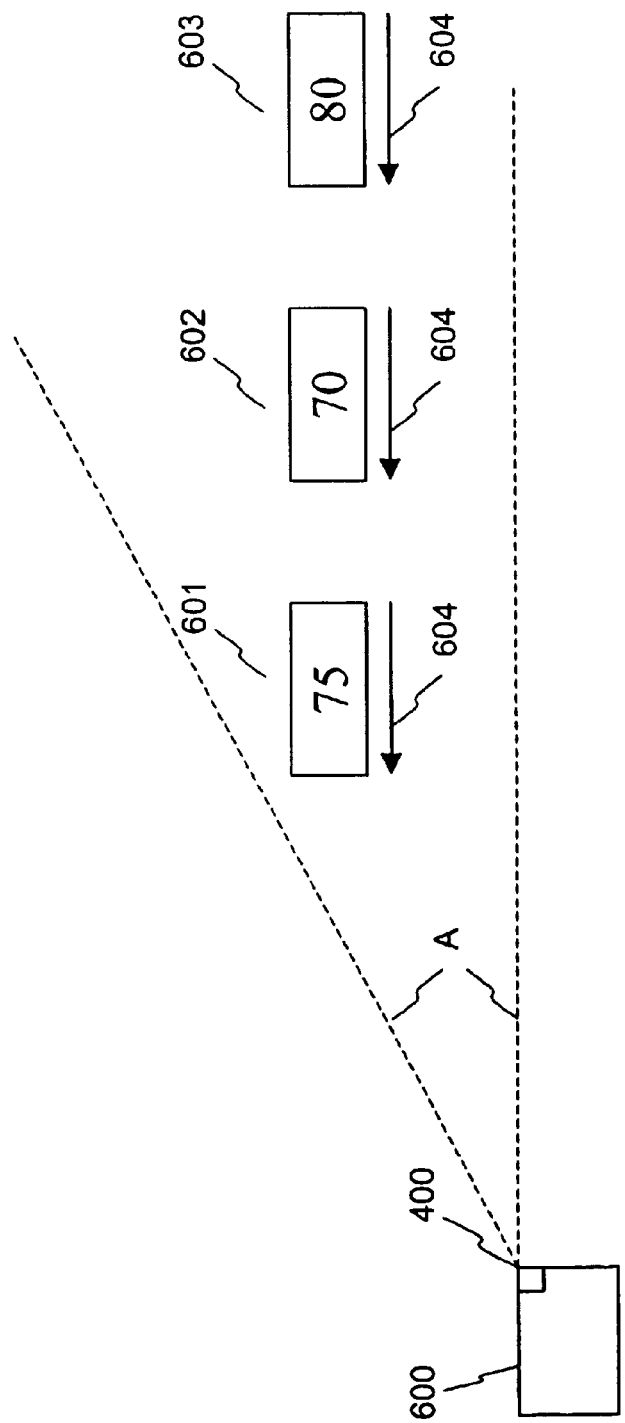
FIG. 9 is a depiction of the MFTRS in operation.

FIG. 9 is a depiction of MFTRS 400 in operation. Patrol vehicle 600 is stationary. All target vehicles are moving in the direction of arrows 604 (towards patrol vehicle 600) and all are within radar angle A. Vehicle 601, moving at 75 mph is the closest and would be displayed in the 'closest' display window. Vehicle 602, moving at 70 mph would not display until vehicle 601 moves outside of radar angle A. Vehicle 603, moving at 80 mph would not display until both vehicle 601 and vehicle 602 move outside of radar angle A. It should again be noted that various designs of the display and function of MFTRS could function to show the 'next faster' (vehicle 603) via operator selection on a handheld, or show 'next closest' (vehicle 602) via operator selection on a handheld.

Figure 10:
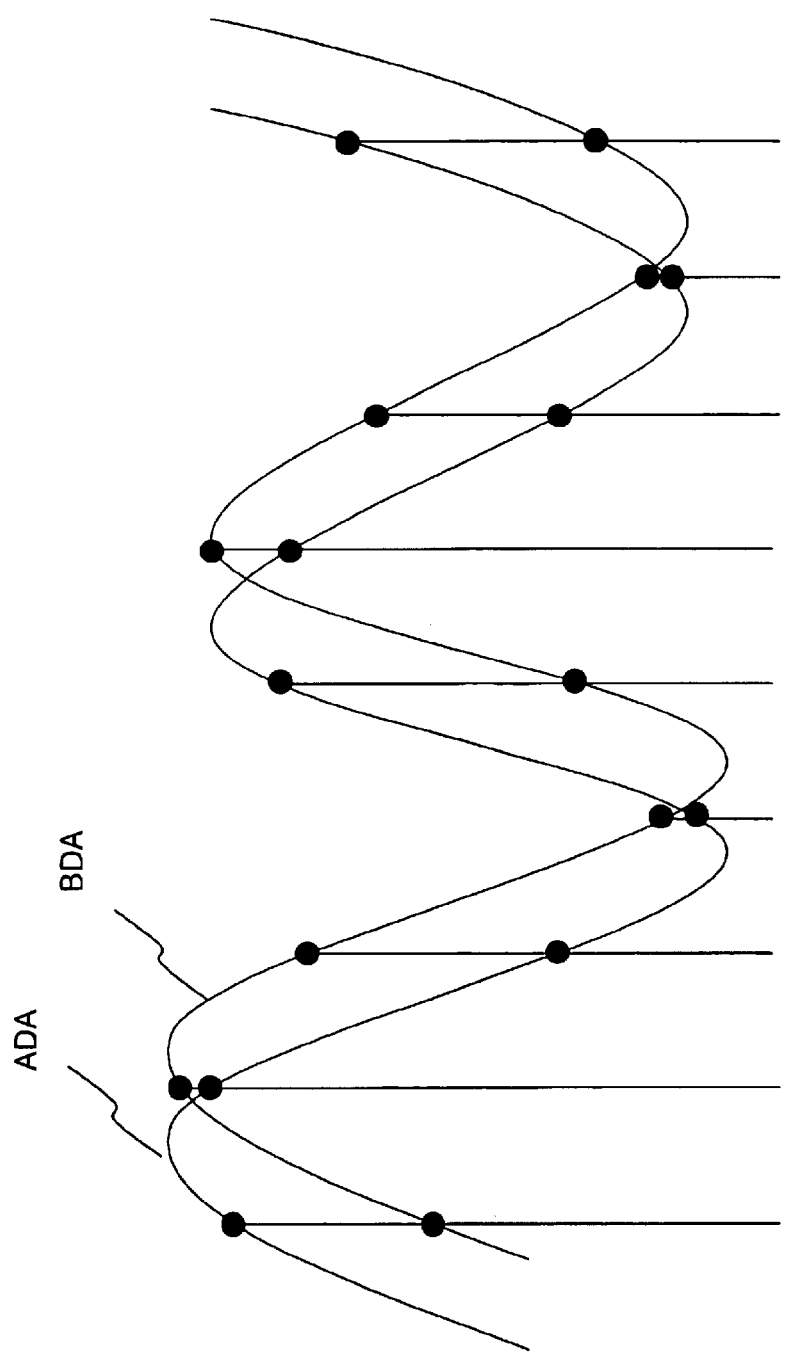
FIG. 10 is a schematic showing the phase difference of the Doppler signals.

FIG. 10 is a schematic showing the phase difference of the Doppler signals. Shown are individual Doppler signal ADA and Doppler signal BDA from FIG. 2 above. The phase difference, or offset, of the signal ADA to signal BDA represents the target range, whereas the frequency of each signal contains the target speed as previously described. The signal frequencies should be identical, or nearly identical and can be used for diagnostic purposes should they deviate by a pre-determined amount.

Figure 11A:
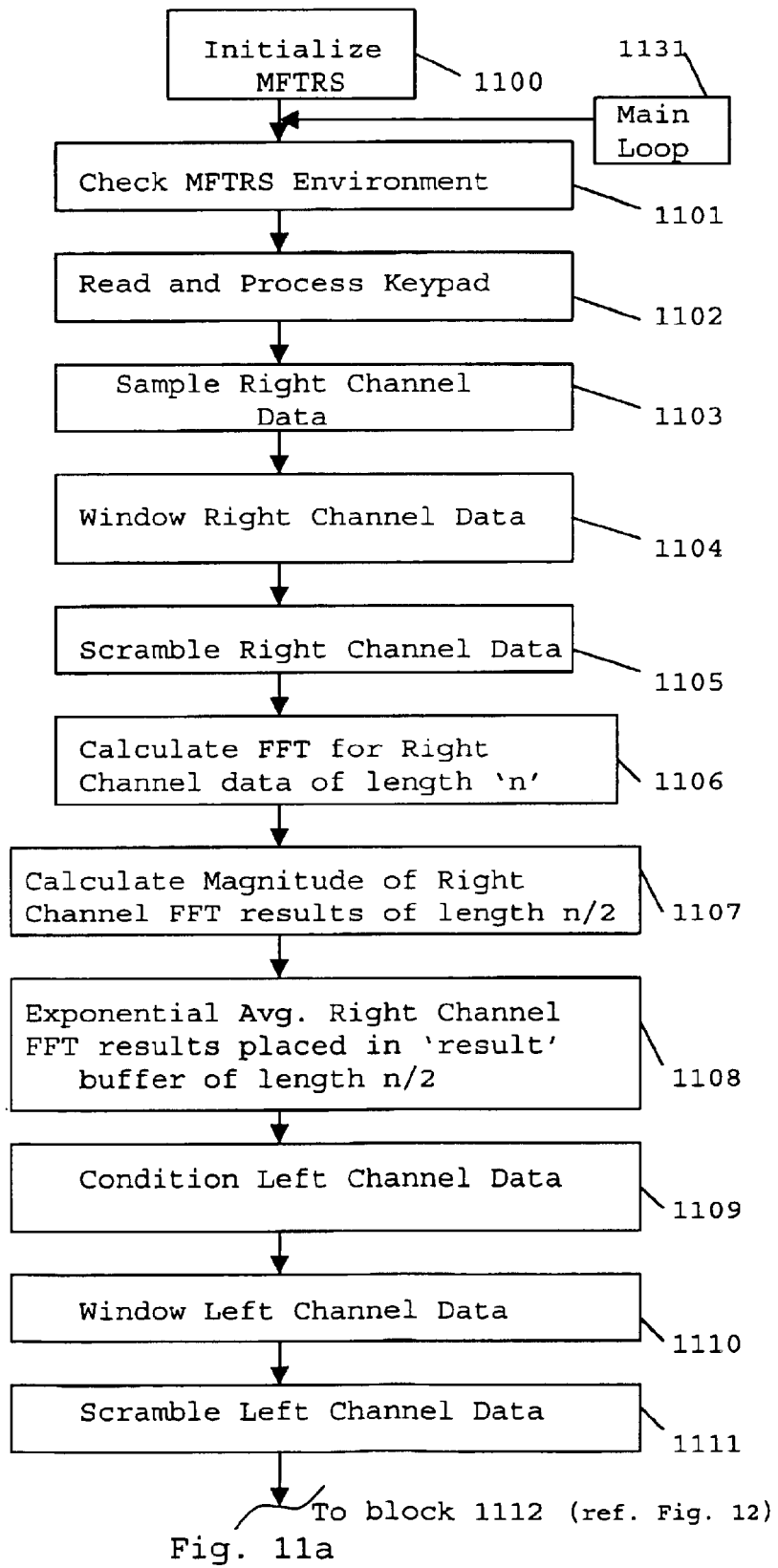
FIGS. 11a, 11b, 11c are flow diagrams of a typical software process for the MFTRS.
Figure 11B:
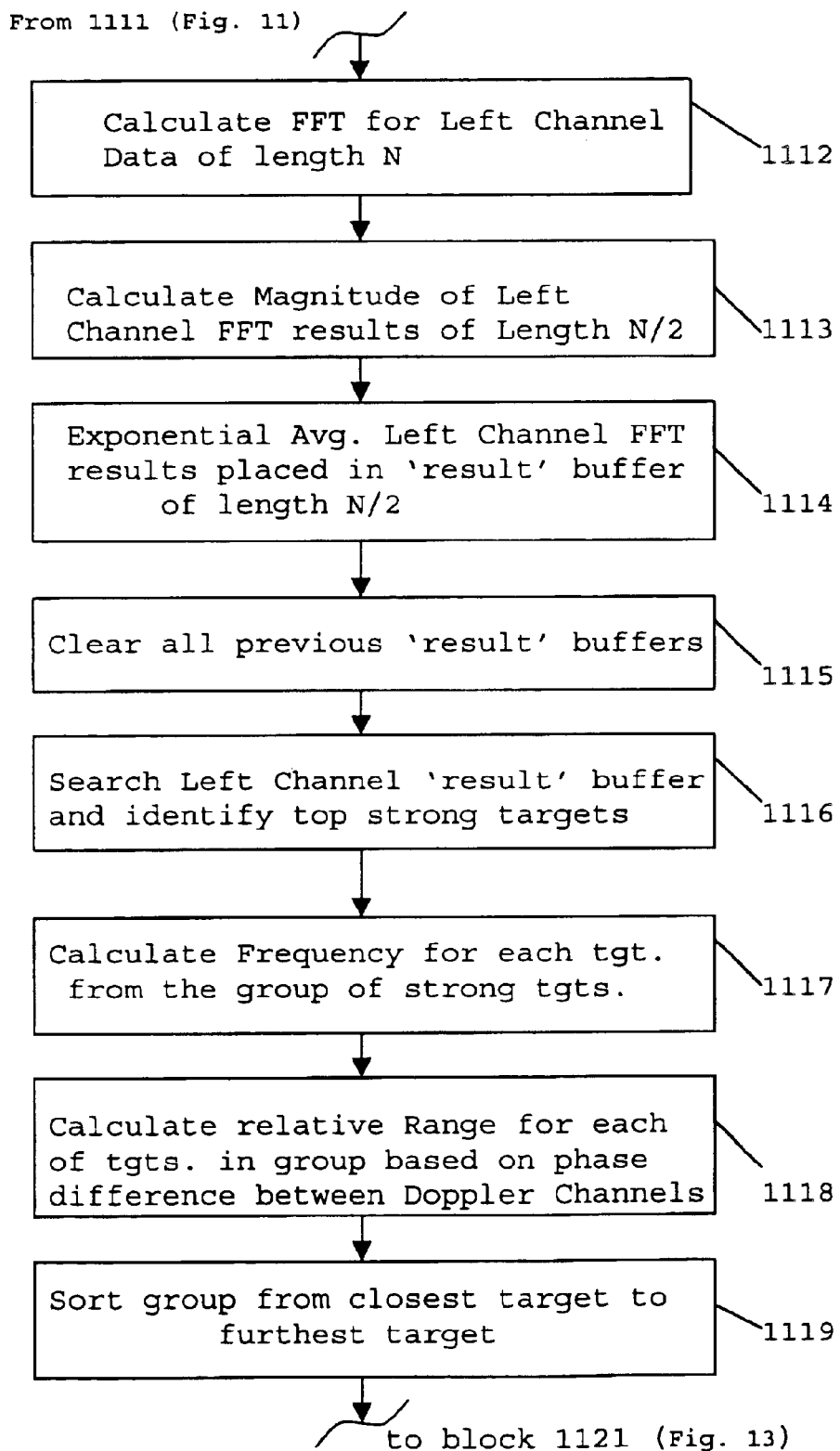
Figure 11C:
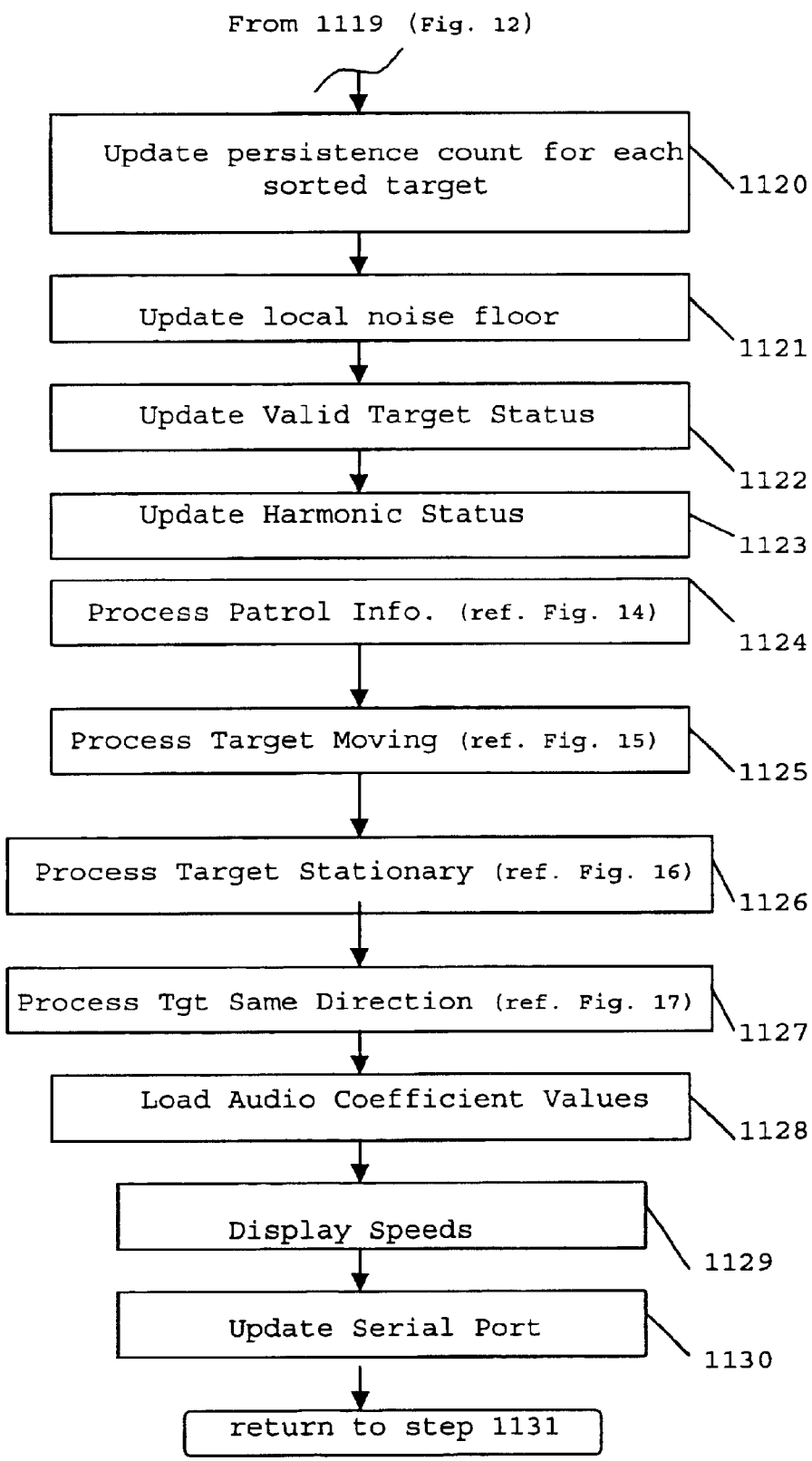

FIGS. 11a, 11b, 11c are flow diagrams of a typical software process for the MFTRS. Initialization of the radar (1100) boots up the software followed by a check of the MFTRS environment (1101) which checks for basic environmental inputs such as a low voltage and RFI noise interference, antenna(s) present to determine if the current speeds detected and computed by the MFTRS are accurate. As aforementioned the MFTRS will also compare the second Doppler frequency to confirm accuracy. Next the keypad of the remote control is read (1102) for volume, active antenna, etc. and corresponding action is taken as required. Right channel Doppler data is then sampled (1103) from the active A/D converter. Right channel data is from the aforementioned FFO channel (see FIG. 3, ADAP or ADAR).

Sampled Doppler data is stored into a large circular buffer of length greater than 'N' (where N is the FFT size). Data is then copied from the circular buffer and stored in the right channel input buffer. In the next step (1104), the software windows right channel data, which is a method common in the art, whereby the software helps the sample signal look continuous to the FFT and eliminates any spectral leakage effects from the rectangular sampling block. A 'Hanning' window is used. Scramble of right channel data (1105), as is standard in the art of DSP, involves placing the sampled data in a predetermined memory location prior to FFT processing. The real data from the right channel is pre-scrambled before applying to the FFT. During the FFT process, the FFT interleaves the sampled data such that the output of the FFT is scrambled. At this point, the FFT output would need to be un-scrambled in order for the data to be interpreted correctly, scrambling before performing the FFT performs, essentially, the same task. Next (1106), the FFT calculation is done for the right channel buffer length of N resulting in the amplitude, phase shift, and Doppler frequency. The scrambled Doppler data from the right channel is transformed by a real FFT (real inputs set by Doppler samples, imaginary data set to zero) in order to produce a spectral image of the Doppler return. The preferred FFT size is 4096 although a larger size will increase resolution but will lower target acquisition time. The positive spectrum magnitude is then calculated (1107) for length N/2, thereby keeping the real vs. imaginary part of the FFT result. This operation takes the real squared and the imaginary squared outputs of the FFT and sums them. The result is stored in a buffer of length 'N/2'. The exponential average of the right channel (1108) FFT results for buffer of length N/2 calculates a moving average with the previous FFT results to help smooth the FFT results to reduce noise and strengthen the periodic signal, thus increases the sensitivity of the MFTRS. The preferred averaging size is 8 averages. Data is placed in a 'result' buffer.

Next the left channel data is sampled and conditioned in steps 1109 through 1114 in a similar fashion to the aforementioned right channel steps 1103 through 1108. Left channel data is from the aforementioned VFO channel (see FIG. 3, BDAF or BDAR). At this point in the processing, the DSP has the resulting amplitude, phase shift and Doppler frequency of both channels from the originating FFO and VFO signals, which emulated from the selected antenna.

The software then clears data from the previous 'result' buffer (1115) and places the newly calculated data into the 'result' buffer. Next the left channel averaged results are searched for the top 'n' strongest targets (1116) such that a group of potentially good targets are selected from the entire spectrum. Only targets with predetermined amplitude are selected. The preferred value of 'n' is 15 but is not critical and only needs to be large so to include as many potential targets as possible. The 'n' strongest returns are potentially the best candidates for further processing as targets. The 'n' target data is then stored in a buffer of length 'n'. The amplitude and FFT bin (FFT input buffer) location is stored for each of the selected targets. The Doppler frequency is then calculated (1117) for each of the 'n'. selected targets and stored in another buffer of size 'n'. The frequency values are computed from the FFT itself. Next the relative range is calculated (1118) by comparing the phase information between the two channels. The phase information is computed from the real and imaginary outputs of the FFT from each channel. After the phase information is calculated from each channel, the phase difference is computed and scaled to a target range. The relative range information is then stored in a buffer of length 'n' along with the amplitude and frequency data.

The next step of the process (1119) involves sorting the target information (amplitude, FFT bin number, range value, etc.) based on the range result of step 1117 above. The sorted targets are stored in a buffer of length 'n'for further processing. The buffer contains a list of potential targets varying from the closest target to the farthest target that was located based on the returned signal processing. The persistence count for each of the sorted targets is updated (1120) by comparing the target buffer to the previous target buffer. If there is sufficient similarity then the 'persistence' count for each target is increased in value. If there is no similarity between the old and new targets, the persistence counts for the new target are cleared. A parameter 'x' is set 'such that if 'x' or more sequential samples are similar, then the sample is validated. The local noise floor is then updated (1121) for each sorted target. The local noise floor is computed by taking the average of the relative noise floor above and below a particular target. This value is used to determine how strong the target is and what value of persistence count it should have to be valid for display. The valid status is then updated (1122) for each sorted target with the aforementioned persistence counts ('x' or more) and noise floor used to determine if a particular target is valid for display. Next the harmonic status for each target is updated (1123). If a target is identified as a possible harmonic, then the target is in-validated, that is, if a target signal strength is too high, it distorts the receiver to look like a false signal and this check would then identify the target as false.

Next, in the process patrol (1124), the target buffer is searched for the closest target meeting certain amplitude criteria. The closest target in moving mode will most likely be the patrol signal. This step (1124) will be explained in more detail in FIG. 12 below. Then in process moving target (1125), the target buffer is searched for the closest target that is above the frequency of the patrol signal. After the target is located, its validity and harmonic status is checked to make certain it is a displayable target. The next closest target traveling faster than the overall closest is also checked and identified as a possible faster target to be displayed. Further details of process moving target will be explained below in FIG. 13. Next, process target stationary (1126), the target buffer is searched for the closest target that is in the return signal. After the target is selected, it is checked for validity and harmonic status to insure it is a displayable target. Further details can be found below in FIG. 16. In process target same direction step (1127), the target buffer is searched for the closest target that is below in frequency of the patrol signal. After the target is located, its valid and harmonic status is checked to determine if it can be displayed. In addition, the targets range information is checked to determine if the patrol signal is overtaking or undertaking the speed of the target signal in order to automatically make the correction for target speed via either adding or subtracting the Doppler frequency from the patrol frequency. Then in load audio coefficients (1128), after a target is selected for display, a tunable digital band pass filter is placed at the frequency of the target signal. The sampled Doppler signals are routed through this band pass filter. The output of the filter is then digitally converted to a square wave, volume adjusted, amplified and applied to a speaker. As subsequent target samples are taken the frequency heard will increase if the target speed increases and will decrease as the target speed decreases. In the display speeds step (1129), the MFTRS sends speed information to the display module. The closest and patrol speed are displayed. Next, the serial port is updated (1130) which is a software switch to send input/output to the DSP serial port for use in downloading information or sending information such as in a roadside display update. Finally, at the end of this sequence of processing, the next step is to return to the main loop entry (1131) to restart the aforementioned sequence.

Figure 12:
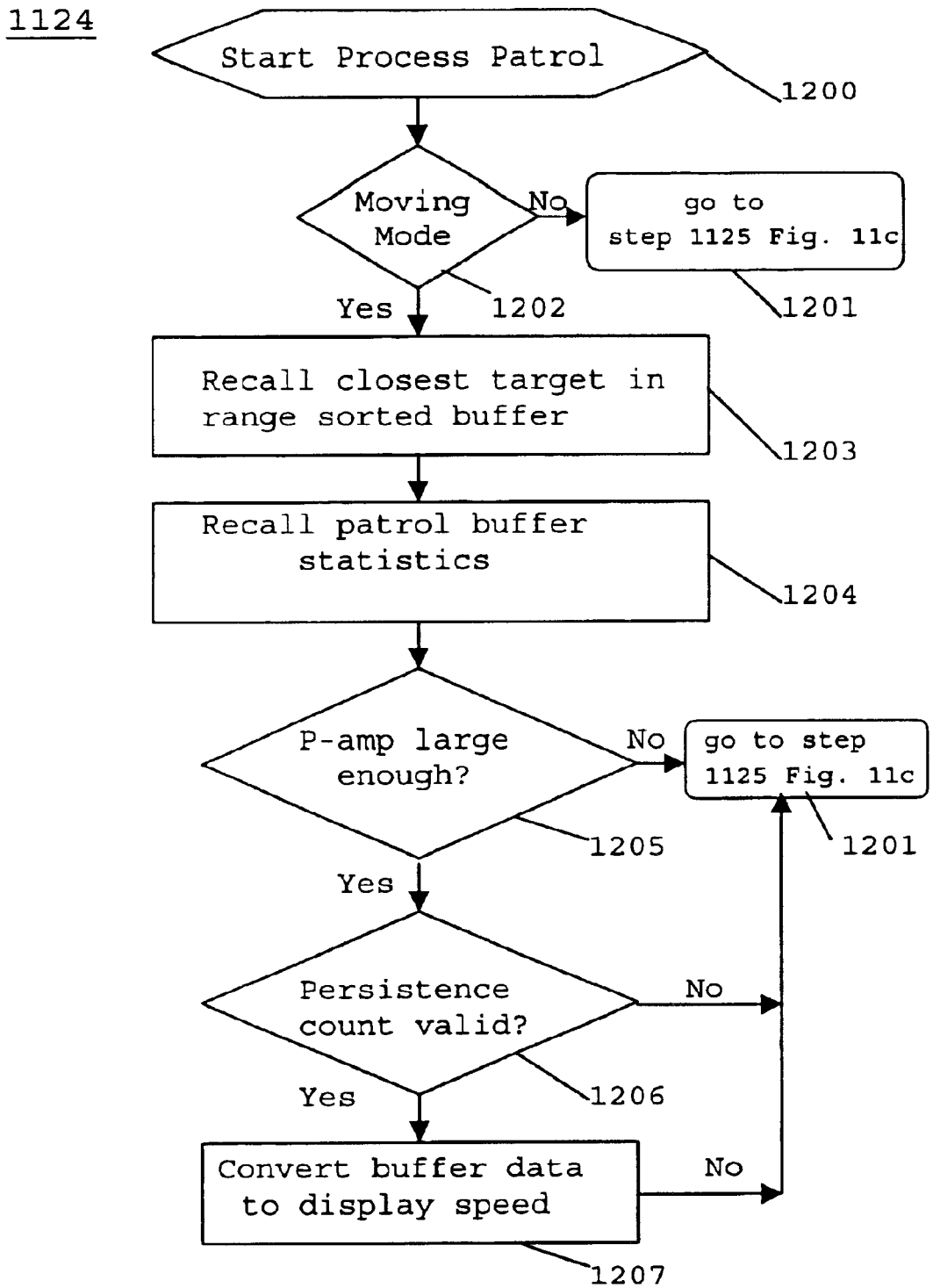
FIG. 12 is a flow diagram of further detail of the process patrol step 1124 of FIG. 11c.

FIG. 12 is a flow diagram of further detail of the process patrol step 1124 of FIG. 11c. At the process patrol start (1200), it is first determined if the patrol vehicle is in moving mode (1202), if not in the moving mode then (1201) return to step 1125 (FIG. 11c). If in the moving mode, recall the closest target in the range sorted buffer (1203), recall the patrol buffer statistics (1204), which are its amplitude, speed and phase. Then test the patrol vehicle amplitude (1205). If not large enough exit (1201) to step 1125 (FIG. 11c). If the patrol amplitude is large enough, then check the persistence count (1206). If the persistence count is not valid, then return to step 1125 (FIG. 11c). If the persistence count is valid, then convert the buffer data to display the patrol speed (1207) and return to step 1125 (FIG. 11c).

Figure 13A:
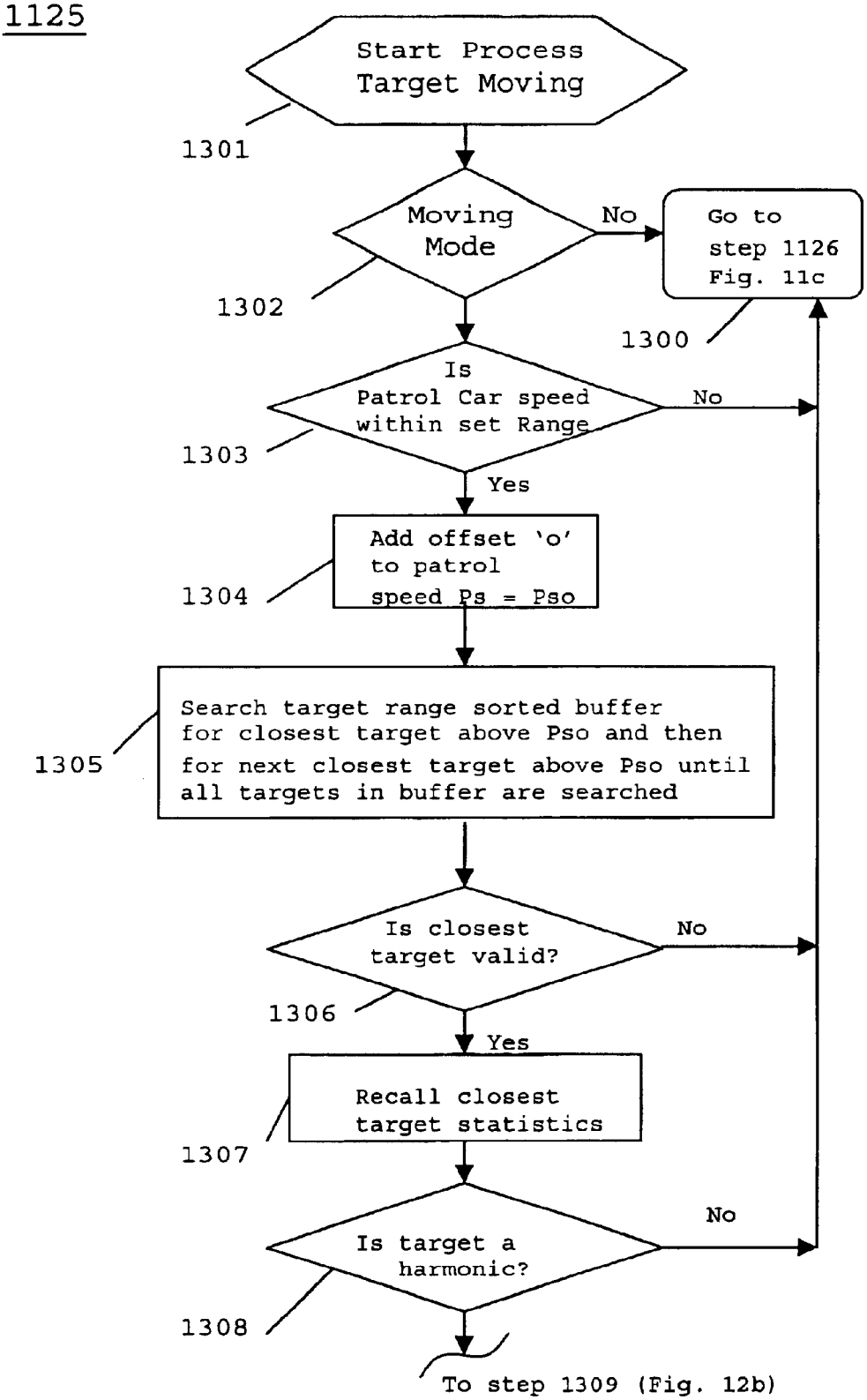
FIGS. 13a, 13b is a flow diagram of further detail of the process target moving step 1125 of FIG. 11c.
Figure 13B:
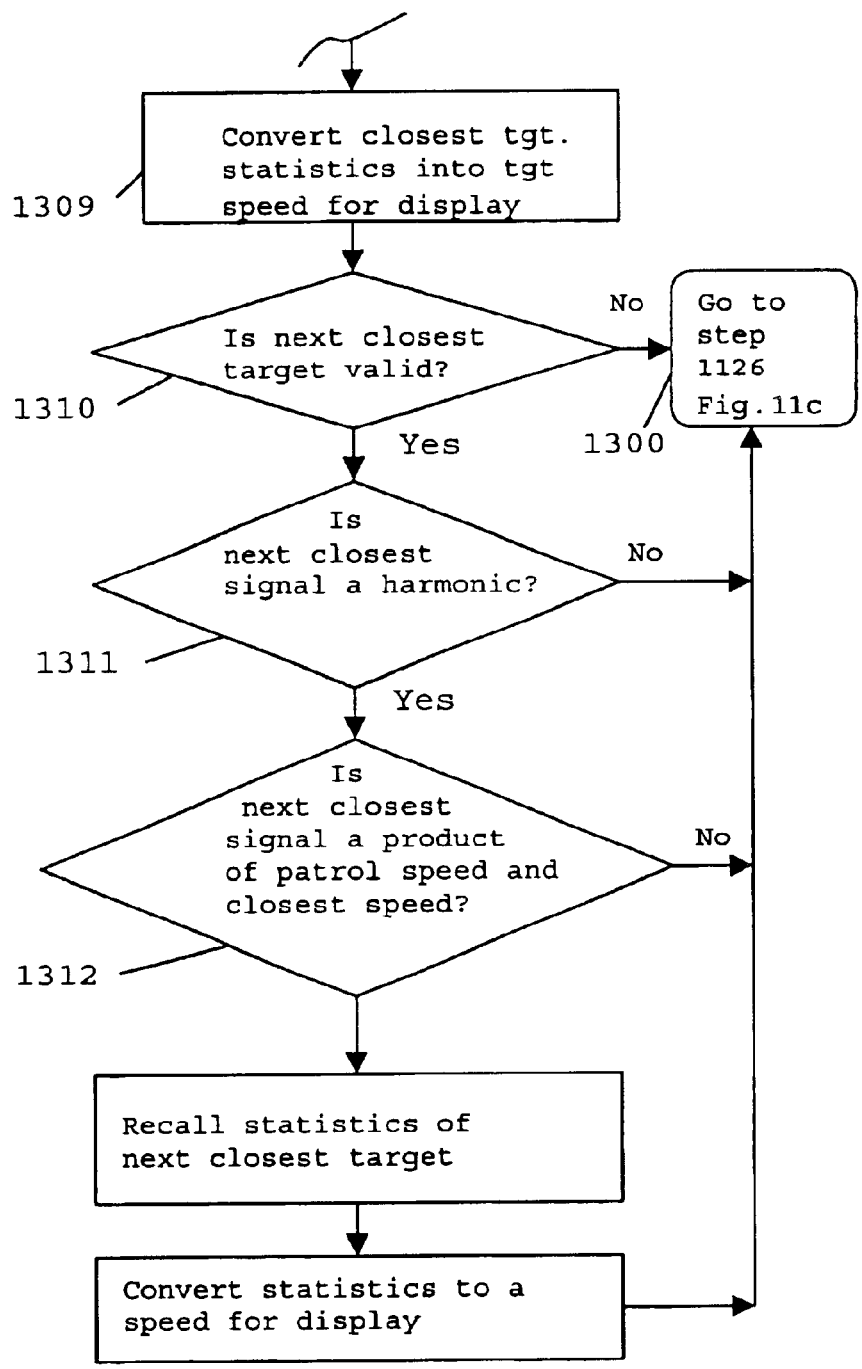

FIGS. 13a, 13b is a flow diagram of further detail of the process target moving, step 1125 of FIG. 11c. At the process target moving start (1301), it is first determined if the patrol vehicle is in moving mode (1302). If not in moving mode, the target moving process is stopped and the process exits to step 1126 (see FIG. 11c). If the patrol vehicle is in moving mode, a determination is next made to see if the patrol vehicle is within a predetermined range (1303), for example within 5 mph to 100 mph. If the patrol vehicle is not within the predetermined range, processing is stopped and the process exits to step 1126 (see FIG. 13). If the patrol vehicle is within the predetermined range, a predetermined offset speed 'o' is added to the patrol speed 'Ps' (1304) to get a speed 'Pso' (patrol plus offset). For example, if the patrol speed is 50 mph, a 6 mph offset will be added. Typical offsets are in the 3–6 mph range. Then search the target range buffer for the closest target above 'Pso' (1305) and save its statistics. Continue to then search the target range buffer for the next closest target above patrol plus offset so on through the target range buffer and save all target statistics. At this point the speed and range of the closest, next closest, etc. are stored. Then a verification of the closest target speed is determined (1306). If not valid, the process is exited to step 1126 of FIG. 13. If valid, the target statistics are recalled from the saved buffer (1307). Target statistics consist of target signal amplitude, speed and range. Next (1308), the target is checked for harmonic status, then statistics are converted into speed for display (1309). Steps 1310, 1311 for the next closest target are similar to steps 1306, 1308. In step 1312 the next closest is tested with an additional filter to see if it is a product (or difference) of the two strongest matches in the buffer. If so, it is disqualified and process is exited to step 1126. If not disqualified, then its statistics are recalled (1313) and converted to a speed for display (1314) and then the process is exited to step 1126. At this point the target buffer has been searched for the closest that is above the frequency of the patrol signal, data has been checked and is available for display. The next closest target data is also available for display.

Figure 14A:
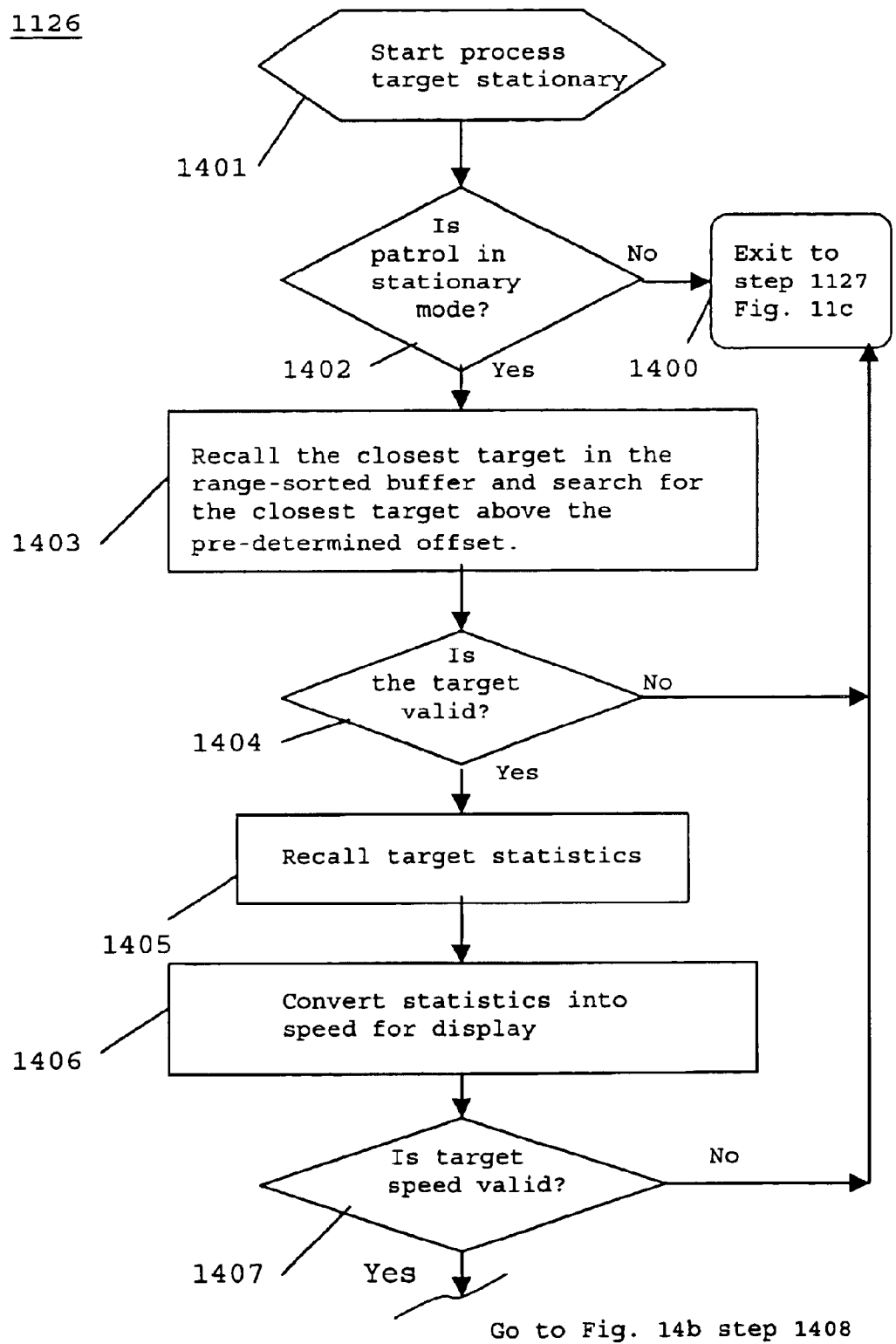
FIGS. 14a, 14b is a flow diagram of further detail of the process target moving step 1126 of FIG. 11c.
Figure 14B:
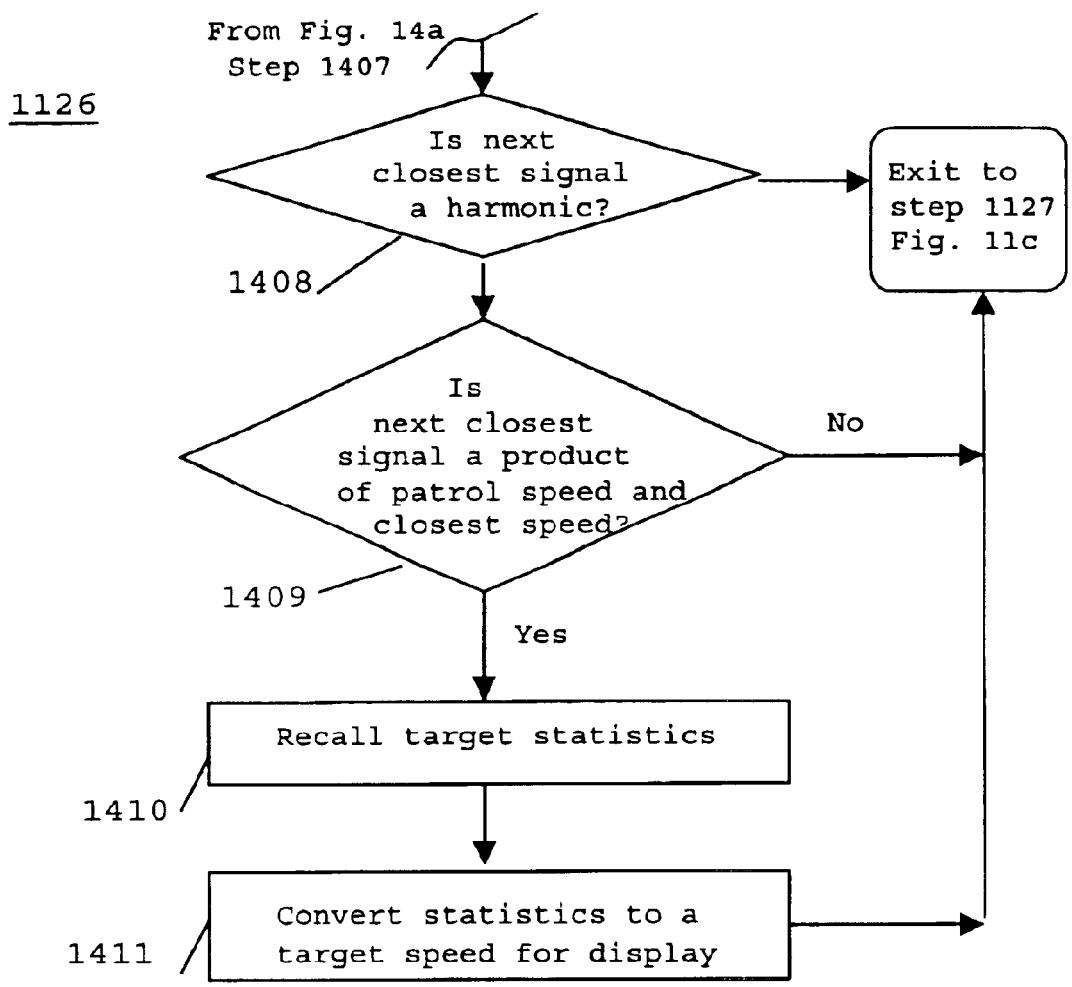

FIGS. 14a, 14b is a flow diagram of further detail of the process target stationary, step 1126 of FIG. 11c. At the process target stationary start (1401), it is first determined if the patrol vehicle is in stationary mode (1402). If not in stationary mode, the process is exited (1400) to step 1127 of FIG. 11c. If in stationary mode, the closest target statistics are recalled from the range-sorted buffer (1403) to find the closest target above the offset for stationary mode. The offset may, for example, be set to the speed limit plus 6 mph. A verification of the target speed is determined (1404) and if not valid, the process is exited (1400) to step 1127 of FIG. 11c. If valid, the target statistics are recalled (1405) and then converted into a speed for display (1406). Steps 1407, 1408 and 1409 check for validity and harmonic status and are similar to steps 1310, 1311, 1312 described above in FIGS. 13a, 13b. Finally, target statistics are recalled from the target buffer (1410) and converted to a speed for display (1411), and the process is then exited. It should be noted that a repeat of all steps in FIGS. 14a, 14b can be performed to check the next closest target, and so on.

Figure 15:
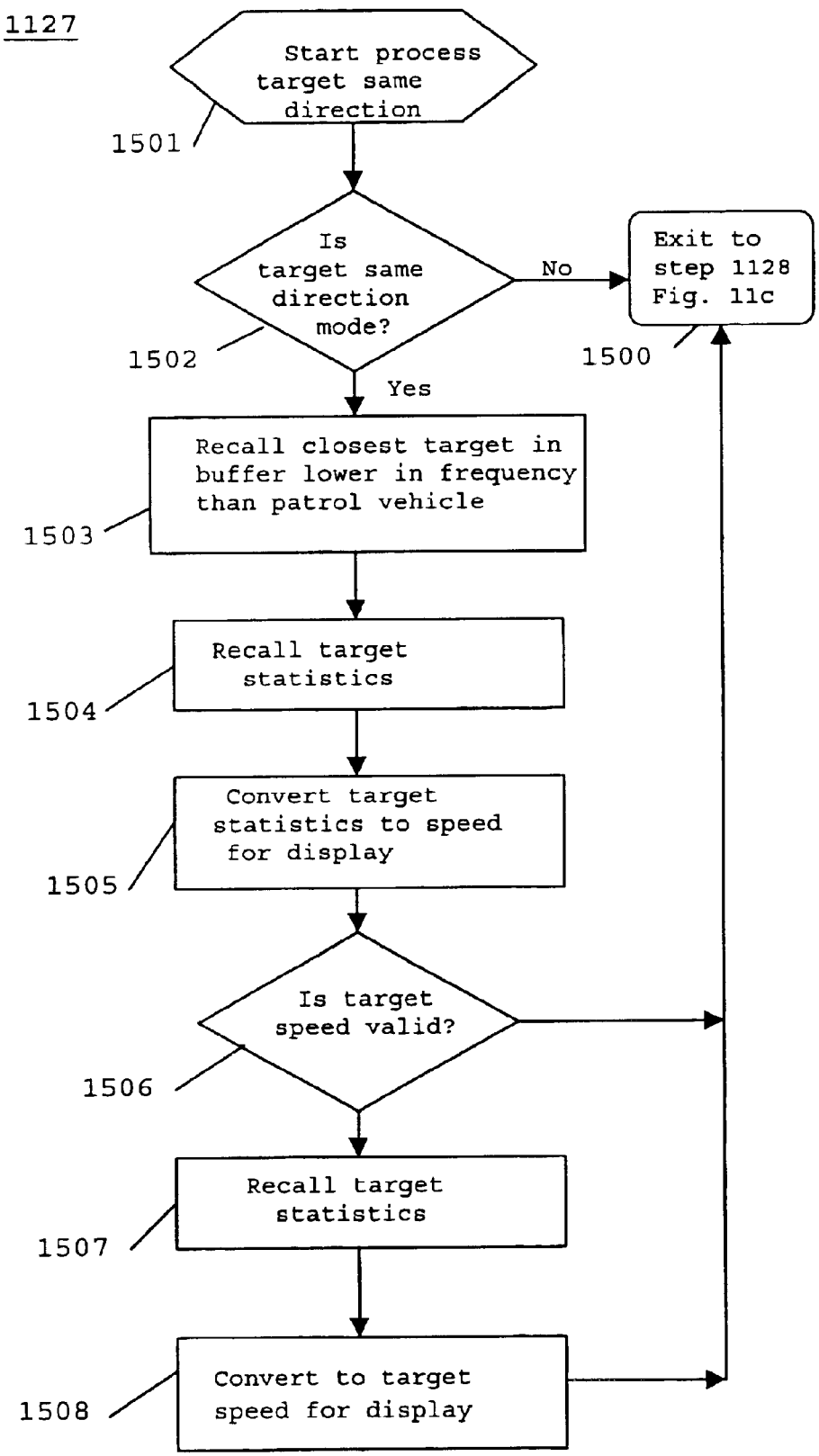
FIG. 15 is a flow diagram of further detail of the process target same direction, step 1127 of FIG. 11c.

FIG. 15 is a flow diagram of further detail of the process target same direction, step 1127 of FIG. 11c. At the process start (1501), it is first determined if the target vehicle is moving in the same direction (1502). If not the same direction, the process is exited to step 1128 (FIG. 11c). If the same direction, the closest range frequency is recalled (1503) which is lower than the patrol. A target going the same direction as the patrol car, for example, could be of a frequency to relate to a speed of 55 mph whereas a target going 70 mph in the same: direction would compute to a relative speed of 15 mph. Next, the statistics for the closest target are recalled (1504) and then converted into a speed for display (1505). If the target is determined to be valid (1505), then its statistics are recalled (1505) and converted into a speed for display (1508). Then the process is exited and returned to step 1128 (FIG. 11c). The targets range information is checked by the system. A target with an increasing range is determined to be going faster than the patrol vehicle whereas a target with a decreasing range is likewise going slower than the patrol vehicle.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An apparatus for remotely determining the range of a first target, the apparatus comprising:

a first oscillator generating a first frequency RF signal;

a second oscillator generating a second frequency RF signal;

a combiner receiving the first and the second frequency RF signals and outputting a continuous, complex transmitted signal;

a target reflected signal receiver which receives a Doppler, continuous complex signal and separates a Doppler first frequency signal and a Doppler second frequency signal; and a signal processor which receives the Doppler first frequency signal and the Doppler second frequency signal and computes a phase shift between the Doppler first and second signals, thereby determining a range of the target.

2. The apparatus of claim 1, wherein the signal processor further computes a speed of the first target.

3. The apparatus of claim 2, wherein the signal processor further computes a range and a speed of the first target, and a range and a speed of a plurality of targets.

4. The apparatus of claim 3, wherein the signal processor controls a display to show a closest target's speed chosen from the first and the plurality of target's speeds.

5. The apparatus of claim 4, wherein the signal processor controls the display to show a next closer target's speed.

6. The apparatus of claim 3, wherein the signal processor controls the display to show a fastest target's speed.

7. The apparatus of claim 4, wherein the signal processor controls the display to show a fastest target's speed.

8. The apparatus of claim 5, wherein the signal processor controls the display to show a next faster target's speed.

9. The apparatus of claim 1, wherein the first oscillator further comprises a fixed frequency oscillator, and the second oscillator further comprises a variable frequency oscillator.

10. The apparatus of claim 9 further comprising a feedback loop and controller to maintain a fixed frequency offset between the first and second oscillator by varying the frequency of the second oscillator.

11. An apparatus for remotely determining the speed and range of a plurality of targets, the apparatus comprising:
   a first oscillator generating a first frequency RF signal;
   a second oscillator generating a second frequency RF signal;
   a combiner receiving the first and the second frequency RF signals and outputting a continuous, complex transmitted signal;
   a target reflected signal receiver which receives a Doppler, continuous complex signal and separates a Doppler first frequency signal and a Doppler second frequency signal for each of the plurality of targets;
   a signal processor which receives the Doppler first frequency signal and the Doppler second frequency signal for each of the plurality of targets and computes a phase shift between the Doppler first and second signals for each of the plurality of targets, thereby determining a range of each target; and
   said signal processor also determining a speed for each target using either the Doppler first or second signal for each target.

12. The apparatus of claim 11, wherein the signal processor controls a display to show a closest target's speed chosen from the plurality of target's speeds.

13. The apparatus of claim 12, wherein the signal processor controls the display to show a next closer target's speed.

14. The apparatus of claim 11, wherein the signal processor controls the display to show a fastest target's speed.

15. The apparatus of claim 12, wherein the signal processor controls the display to show a fastest target's speed.

16. The apparatus of claim 14, wherein the signal processor controls the display to show a next faster target's speed.

17. The apparatus of claim 15, wherein the signal processor controls the display to show the next faster target's speed.

18. The apparatus of claim 11, wherein the first oscillator further comprises a fixed frequency oscillator, and the second oscillator further comprises a variable frequency oscillator.

19. The apparatus of claim 18 further comprising a feedback loop and controller to maintain a fixed frequency offset between the first and second oscillator by varying the frequency of the second oscillator.

20. A method of remotely determining the speed and range of a plurality of moving targets, the method comprising the steps of:
   a) transmitting a continuous complex RF signal consisting of a combination of a first frequency signal and a second frequency signal;
   b) receiving a target reflected signal from a plurality of moving targets;
   c) converting the target reflected signal to extract a first frequency Doppler signal and a second frequency Doppler signal;
   d) measuring a phase shift between the first frequency Doppler signal and the second frequency Doppler signal;
   e) separating each target's first and second Doppler signal; and
   f) computing for each target its range and speed.

21. The method of claim 20 including the steps of:
   a) selecting a target based on its range or on its speed from the plurality of targets; and
   b) displaying the selected target's range or speed.

22. The method of claim 20 further including the steps of:
   a) converting the target's reflected first frequency Doppler signal from an analog signal to a first digital Doppler signal;
   b) converting the target's reflected second frequency Doppler signal from an analog signal to a second digital Doppler signal;
   c) providing a clock generation circuitry for time multiplexing both the first digital Doppler signal and the second digital Doppler signal;
   d) providing a signal processor to perform a fast fourier transform to determine the spectral content to separate a plurality of target data from the first digital Doppler and the second digital Doppler signal;
   e) providing a signal processor to compute a phase difference between the first digital Doppler signal and the second digital Doppler signal;
   f) using the computed phase difference to compute a target range for each of the plurality of targets;
   g) using the frequency of the first digital Doppler signal or the second digital Doppler signal to compute a target speed for each of the plurality of targets; and
   h) storing each computed target speed and range for further display.

23. The method of claim 22, wherein the provided signal processor compares the frequencies of first digital Doppler signal and the second digital Doppler signal, and disregards the computed target's speed and range data if the difference in compared frequencies is greater than a set magnitude.

24. An apparatus for remotely determining the range of a first target, the apparatus comprising:
   a circuit generating a first frequency RF signal and generating a second frequency RF signal and generating a combined complex first and second frequency RF signal transmitted signal;
   a target reflected signal receiver which receives a Doppler, continuous complex signal and separates a Doppler first frequency signal and a Doppler second frequency signal; and
   a signal processor which receives the Doppler first frequency signal and the Doppler second frequency signal and computes a phase shift between the Doppler first and second signals, thereby determining a range of the first target.

25. The apparatus of claim 24, wherein the signal processor further computes a speed of the first target.

26. The apparatus of claim 25, wherein the signal processor further computes a range and a speed of the first target, and a range and a speed of a plurality of targets.

27. The apparatus of claim 26, wherein the signal processor controls a display to show a closest target's speed chosen from the first and the plurality of target's speeds.

28. The apparatus of claim 27, wherein the signal processor controls the display to show, a next closer target's speed.

29. The apparatus of claim 28, wherein the signal processor controls the display to show a next faster target's speed.

30. The apparatus of claim 27, wherein the signal processor controls the display to show a fastest target's speed.

31. The apparatus of claim 26, wherein the signal processor controls the display to show a fastest target's speed.

32. An apparatus for remotely determining the speed and range of a plurality of targets, the apparatus comprising:
- a circuit generating a first frequency RF signal and a second frequency RF signal and combining the first and the second frequency RF signals and outputting a continuous, complex transmitted signal;
- a target reflected signal receiver which receives a Doppler, continuous complex signal and separates a Doppler first frequency signal and a Doppler second frequency signal for each of the plurality of targets;
- a signal processor which receives the Doppler first frequency signal and the Doppler second frequency signal for each of the plurality of targets and computes a phase shift between the Doppler first and second signals for each of the plurality of targets, thereby determining a range of each target; and
- said signal processor also determining a speed for each target using either the Doppler first or second signal for each target.

33. The apparatus of claim 32, wherein the signal processor controls a display to show a closest target's speed chosen from the plurality of target's speeds.

34. The apparatus of claim 33, wherein the signal processor controls the display to show a next closer target's speed.

35. The apparatus of claim 33, wherein the signal processor controls the display to show a fastest target's speed.

36. The apparatus of claim 35, wherein the signal processor controls the display to show the next faster target's speed.

37. The apparatus of claim 32, wherein the signal processor controls the display to show a fastest target's speed.

38. The apparatus of claim 37, wherein the signal processor controls the display to show a next faster target's speed.

* * * * *